(12) United States Patent
Scherer et al.

(10) Patent No.: US 10,969,763 B2
(45) Date of Patent: Apr. 6, 2021

(54) SYSTEMS AND METHODS TO ADAPT AND OPTIMIZE HUMAN-MACHINE INTERACTION USING MULTIMODAL USER-FEEDBACK

(71) Applicant: Embodied, Inc., Pasadena, CA (US)

(72) Inventors: Stefan Scherer, Santa Monica, CA (US); Paolo Pirjanian, Pasadena, CA (US); Albert Asatoorian, Pasadena, CA (US)

(73) Assignee: Embodied, Inc., Pasadena, CA (US)

( * ) Notice: Subject to any disclaimer, the term of this patent is extended or adjusted under 35 U.S.C. 154(b) by 130 days.

(21) Appl. No.: 16/531,118

(22) Filed: Aug. 4, 2019

(65) Prior Publication Data

US 2020/0050173 A1  Feb. 13, 2020

Related U.S. Application Data

(60) Provisional application No. 62/715,665, filed on Aug. 7, 2018.

(51) Int. Cl.
*G05B 19/04* (2006.01)
*G05B 19/408* (2006.01)
(Continued)

(52) U.S. Cl.
CPC ....... *G05B 19/4083* (2013.01); *B25J 11/0005* (2013.01); *B25J 13/08* (2013.01); *G06K 9/00241* (2013.01); *G06K 9/00355* (2013.01)

(58) Field of Classification Search
CPC ...... B25J 11/0005; B25J 11/001; B25J 13/08; B25J 9/163; B25J 11/008; B25J 13/003;
(Continued)

(56) References Cited

U.S. PATENT DOCUMENTS 7,442,107 B1 * 10/2008 Ueda ................. A63H 11/20
446/175
2002/0019193 A1 * 2/2002 Maggiore ............ A63H 3/48
446/337
(Continued)

OTHER PUBLICATIONS

International Search Report and Written Opinion of the International Searching Authority, dated Oct. 29, 2019, PCT/US19/45037, 13 pages.

*Primary Examiner* — Harry Y Oh

(57) ABSTRACT

Systems and methods for human-machine interaction. An adaptive behavioral control system of a human-machine interaction system controls an interaction sub-system to perform a plurality of actions for a first action type in accordance with a computer-behavioral policy, each action being a different alternative action for the action type. The adaptive behavioral control system detects a human reaction of an interaction participant to the performance of each action of the first action type from data received from a human reaction detection sub-system. The adaptive behavioral control system stores information indicating each detected human reaction in association with information identifying the associated action. In a case where stored information indicating detected human reactions for the first action type satisfy an update condition, the adaptive behavioral control system updates the computer-behavioral policy for the first action type.

23 Claims, 15 Drawing Sheets

(51) Int. Cl.
  *B25J 11/00* (2006.01)
  *G06K 9/00* (2006.01)
  *B25J 13/08* (2006.01)
(58) Field of Classification Search
  CPC ........ B25J 13/006; B25J 13/089; B25J 9/162;
    B25J 9/1664; B25J 9/1669; B25J 9/1694;
    B25J 9/1697; G05B 19/4083; G05B
    2219/23067; G05B 2219/36133; G05B
    2219/40202; G05B 2219/40413; G05B
    2219/40414; G05B 19/045; G05B
    2219/40403; G06K 9/00241; G06K
    9/00302; G06K 9/00335; G06K 9/00355
  See application file for complete search history.

(56) References Cited

U.S. PATENT DOCUMENTS

| | | | | |
|---|---|---|---|---|
| 2002/0169733 | A1* | 11/2002 | Peters, II | B25J 9/163 |
| | | | | 706/45 |
| 2003/0182123 | A1* | 9/2003 | Mitsuyoshi | G10L 17/26 |
| | | | | 704/270 |
| 2005/0149227 | A1* | 7/2005 | Peters, II | G05D 1/0274 |
| | | | | 700/245 |
| 2011/0004341 | A1* | 1/2011 | Sarvadevabhatla | B25J 9/1602 |
| | | | | 700/250 |
| 2011/0295392 | A1* | 12/2011 | Cunnington | H04N 7/15 |
| | | | | 700/90 |
| 2012/0182392 | A1* | 7/2012 | Kearns | B25J 19/023 |
| | | | | 348/46 |
| 2013/0078600 | A1* | 3/2013 | Fischer | G09B 19/00 |
| | | | | 434/236 |
| 2014/0316570 | A1* | 10/2014 | Sun | B25J 11/0005 |
| | | | | 700/255 |
| 2017/0100842 | A1* | 4/2017 | Le Borgne | B25J 9/1694 |
| 2017/0113353 | A1* | 4/2017 | Monceaux | G10L 15/26 |
| 2017/0160813 | A1* | 6/2017 | Divakaran | G06K 9/00221 |
| 2017/0206064 | A1* | 7/2017 | Breazeal | G06F 8/36 |
| 2017/0311863 | A1* | 11/2017 | Matsunaga | A61B 5/163 |
| 2017/0352351 | A1* | 12/2017 | Kimura | B25J 11/001 |
| 2018/0068177 | A1* | 3/2018 | Sakai | G06K 9/00288 |
| 2018/0075659 | A1* | 3/2018 | Browy | G06F 3/017 |
| 2018/0133900 | A1* | 5/2018 | Breazeal | B25J 19/026 |
| 2018/0229372 | A1* | 8/2018 | Breazeal | B25J 11/001 |
| 2018/0281196 | A1* | 10/2018 | Sakai | B25J 11/008 |
| 2019/0291277 | A1* | 9/2019 | Oleynik | B25J 9/163 |
| 2021/0034959 | A1* | 2/2021 | Wood | G06F 3/017 |

* cited by examiner

Policy 301

| Policy | | |
|---|---|---|
| Action Type A | | |
| Action | Weight Value | Positive Reaction? (Y/N) |
| Action A | 70% | |
| Action B | 20% | |
| Action C | 10% | |

Weighted sequence: AAAAAAABBC

Policy 302

| Policy | | |
|---|---|---|
| Action Type A | | |
| Action | Weight Value | Positive Reaction? (Y/N) |
| Action A | 70% | YYNNNNNNNN |
| Action B | 20% | YYNNNNNNNN |
| Action C | 10% | YYYYYYNNNN |

Weighted sequence: AAAAAAABBC

Policy 303

| Policy | | |
|---|---|---|
| Action Type A | | |
| Action | Weight Value | Positive Reaction? (Y/N) |
| Action A | 20% | YYNNNNNNNN |
| Action B | 20% | YYNNNNNNNN |
| Action C | 60% | YYYYYYNNNN |

Weighted sequence: AABBCCCCCC

Policy 304

| Policy | | |
|---|---|---|
| Action Type A | | |
| Action | Weight Value | Positive Reaction? (Y/N) |
| Action A | 20% | YYNNNNNNNNNNYYYYYYY |
| Action B | 20% | YYNNNNNNNNNNNNNNNYN |
| Action C | 60% | YYYYYYNNNNNNNNNNNNY |

Weighted sequence: AABBCCCCCC

Policy 305

| Policy | | |
|---|---|---|
| Action Type A | | |
| Action | Weight Value | Positive Reaction? (Y/N) |
| Action A | 80% | YYNNNNNNNNNYYYYYYY |
| Action B | 10% | YYNNNNNNNNNNNNNNYN |
| Action C | 10% | YYYYYYNNNNNNNNNNNY |

Weighted sequence: AABBCCCCCC

SYSTEMS AND METHODS TO ADAPT AND OPTIMIZE HUMAN-MACHINE INTERACTION USING MULTIMODAL USER-FEEDBACK

CROSS-REFERENCE TO RELATED APPLICATIONS

This application claims the benefit of U.S. Provisional Application Ser. No. 62/715,665, filed on Aug. 7, 2018, which is incorporated in its entirety by this reference.

TECHNICAL FIELD

This disclosure relates generally to human-machine interaction systems, and more specifically to new and useful systems and methods for using user feedback in human-machine interaction systems.

BACKGROUND

Typical human-machine interaction systems receive user feedback received via an input device.

DESCRIPTION OF EMBODIMENTS

Figure 1A:
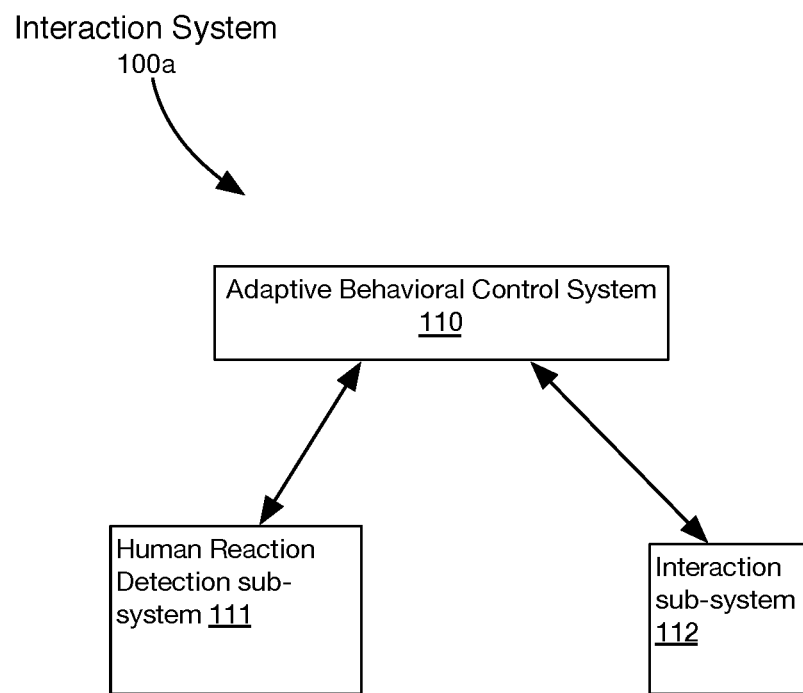
FIGS. 1A-D are schematic representations of systems, according to embodiments.

The following description of embodiments is not intended to limit the disclosure to these embodiments, but rather to enable any person skilled in the art to make and use the embodiments disclosed herein.
Overview Embodiments herein include systems and methods that use an adaptive behavioral control system (of a human-machine interaction system) that uses a computer-readable computer-behavioral policy to control at least one of an audio output system, a display device, and a robot. The adaptive behavioral control system is constructed to update the computer-behavioral policy in response to information indicating a detected human reaction.

In some embodiments, the computer-behavioral policy specifies a plurality of actions for a specific action type and a weight value for each action. For example, for a "greeting" action type, the policy can include three different greeting action options, each with a corresponding weight value. In some embodiments, each weight value corresponds to a use frequency. In some embodiments, each weight value is a percentage corresponding to how often a particular action should be performed, and the weights of all actions for the action type total 100%. In some embodiments, each weight value is used to generate a weighted random sampling, and actions of a particular type of action are selected based on the weighted random sampling.

An initial computer-behavioral policy is generated, and an action for an action type is performed, the adaptive behavioral control system stores information indicating a human reaction detected in response to performance of the action in association with information identifying the action. In this manner, the adaptive behavioral control system creates a log of all recorded reactions for an action.

In a case where stored information indicating detected human reactions for an action satisfies an update condition, the adaptive behavioral control system updates the weight values for the action and the other actions of the same action type in the computer-behavioral policy. In some embodiments, in a case where stored information indicating detected human reactions for a first action indicates positive user feedback below a threshold value, the adaptive behavioral control system decreases the weight value of the first action. In some embodiments, in a case where stored information indicating detected human reactions for the first action indicates positive user feedback above the threshold value, the adaptive behavioral control system increases the weight value of the first action. In this manner, the adaptive behavioral control system updates weight values of actions in the computer-behavioral policy to elicit positive user feedback by a human interaction participant in response to control of the human-machine interaction system in accordance with the computer-behavioral policy.

In some embodiments, the human-machine interaction system is a robot that includes a mechanical body assembly (e.g., 104d of FIG. 1D), a movable mechanical face assembly (e.g., 103d of FIG. 1D), and at least one movable mechanical appendage (e.g., 105d of FIG. 1D), and the adaptive behavioral control system is constructed to control the face assembly in accordance with the computer-behavioral policy. In some embodiment, control of the face assembly in accordance with the computer-behavioral policy includes: controlling the face assembly to orient the face assembly in a direction of a detected face of an interaction participant, by using at least one of audio data captured by an audio capture system and image data captured by a video capture system. In some embodiments, an action of an action type of the computer-behavioral policy includes controlling the face assembly to orient the face assembly in a direction of a detected face of an interaction participant. In some embodiments, an action of an action type includes a talking action. In some embodiments, an action of an action type of the computer-behavioral policy includes controlling the robot to perform a talking action. In some embodiments, an action of an action type of the computer-behavioral policy includes controlling the robot to move. In some embodiments, an action of an action type of the computer-behavioral policy includes controlling the robot to perform movement that corresponds to a gesture.

In some embodiments, the adaptive behavioral control system is constructed to detect presence of interaction participants and respective locations, and generate a three-dimensional world model of detected locations of detected interaction participants. In some embodiments, during initiation of an interaction with a previously detected interaction participant, the adaptive behavioral control system controls the face assembly to orient the face assembly in a direction of a detected interaction participant by using the previously detected location included in the world model. In some embodiments, the adaptive behavioral control system is constructed to generate a three-dimensional world model of all detected faces, and wherein during initiation of an interaction with a participant associated with a previously detected face, the adaptive behavioral control system controls the face assembly to orient the face assembly in a direction of a detected face by using the previously detected direction included in the world model.

In some embodiments, weight values of the computer-behavioral policy are updated based on information received from at least one external human-machine interaction system.

Systems

FIG. 1A

Figure 2:
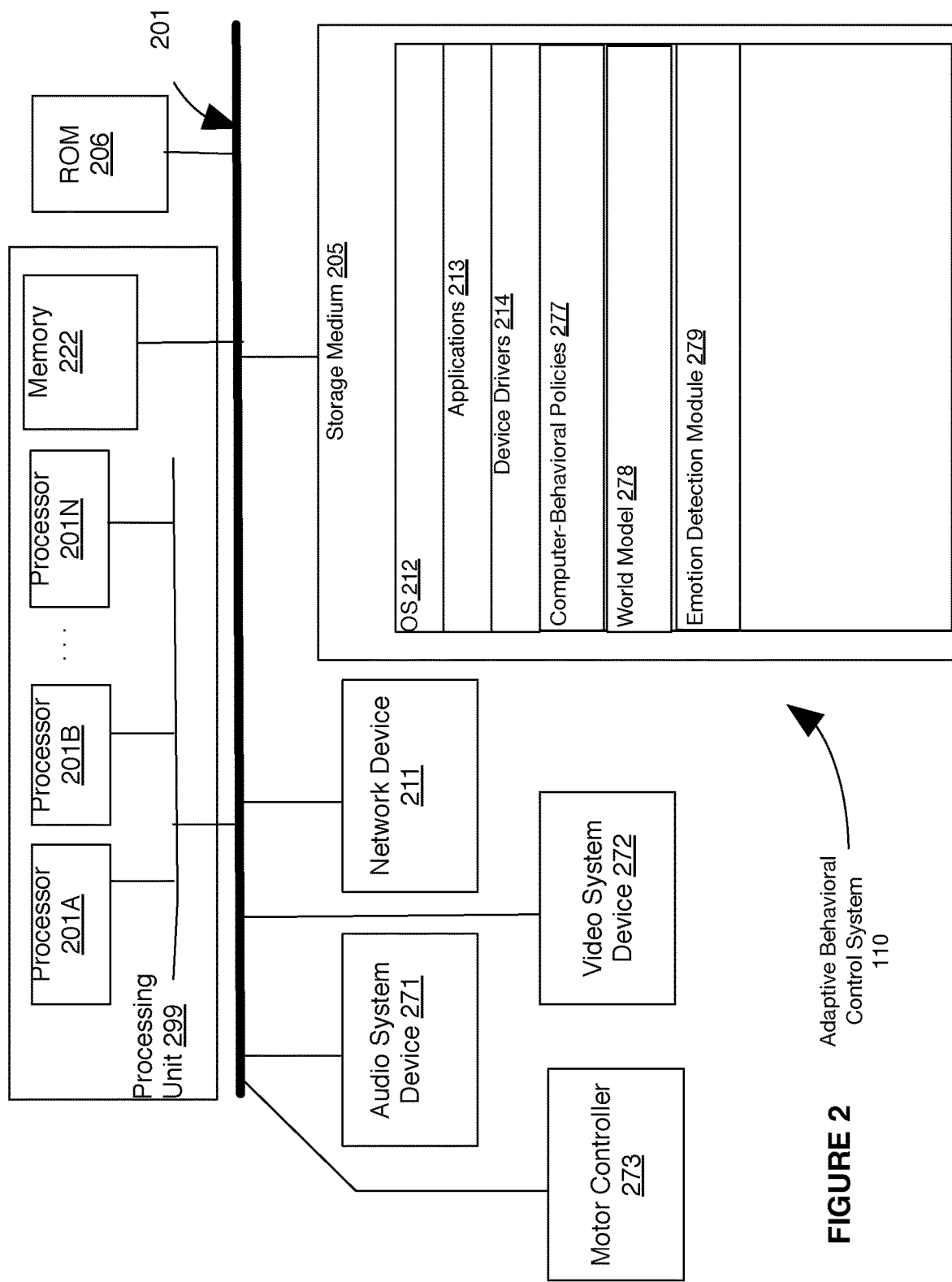
FIG. 2 is a diagram depicting system architecture of a system, according to embodiments.

In some embodiments, a human-machine interaction system 100a includes adaptive behavioral control system 110, an interaction sub-system 112, and a human reaction detection sub-system 111, as shown in FIG. 1A. In some embodiments, the adaptive behavioral control system 110 is a computing system, as shown in FIG. 2. In some embodiments, the adaptive behavioral control system 110 is one of an FPGA, an ASIC, and a system on a chip (SoC).

Interaction Sub-System

Figure 1B:
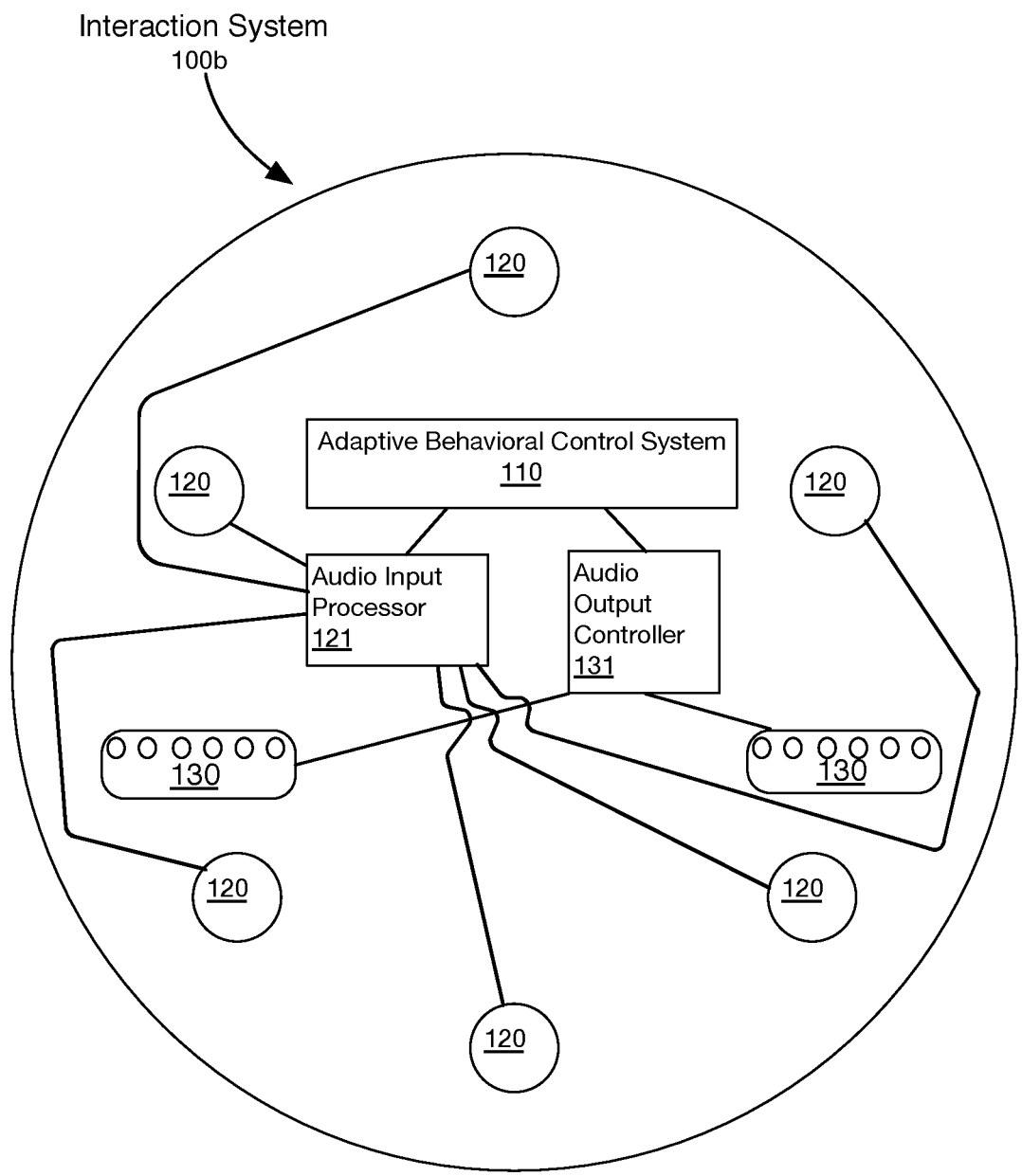
Figure 1C:
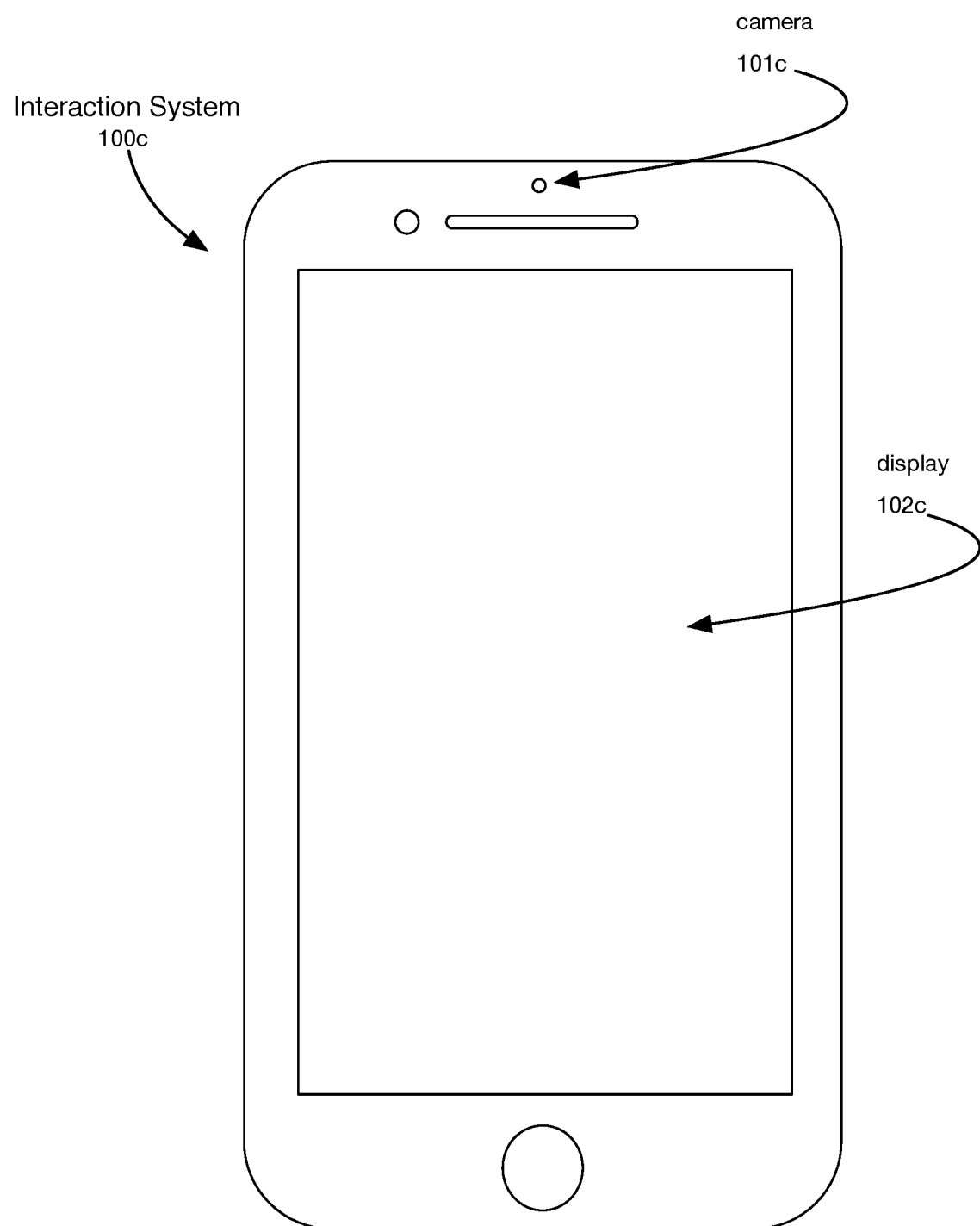
Figure 1D:
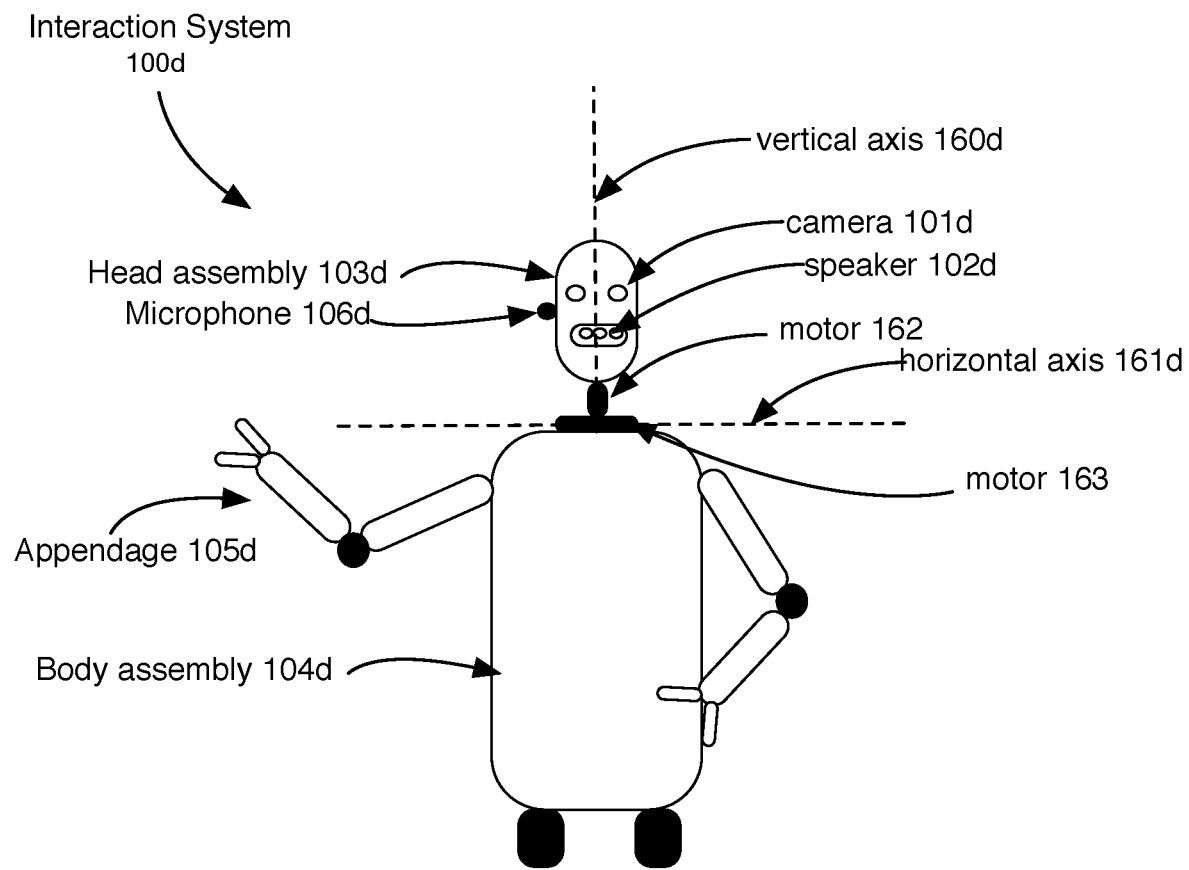

In some embodiments, the interaction sub-system 112 includes an audio output sub-system (e.g., 130 of FIG. 1B, 102d of FIG. 1D). In some embodiments, the interaction sub-system 112 includes a video display sub-system (e.g., 102C of FIG. 1C). In some embodiments, the interaction sub-system 112 includes a mechanical robotic sub-system (e.g., head assembly 103d, appendage 105d of FIG. 1). In some embodiments, the interaction sub-system 112 includes a light emission sub-system. In some embodiments, the interaction sub-system 112 includes a LED (Light Emitting Diode) ring.

In some embodiments, the audio output sub-system includes at least one speaker (e.g., 130 of FIG. 1B, 102d of FIG. 1D). In some embodiments, the audio output sub-system includes at least one audio output device. In some embodiments, the video display sub-system includes at least one display device (e.g., 102c of FIG. 1C). In some embodiments, the mechanical robotic sub-system includes at least one robotic body assembly (e.g., 104d of FIG. 1D). In some embodiments, the mechanical robotic sub-system includes at least one robotic body head assembly (e.g., 103d of FIG. 1D). In some embodiments, the mechanical robotic sub-system includes at least one robotic appendage (e.g., 105d of FIG. 1D). In some embodiments, the mechanical robotic sub-system includes at least one robotic body head assembly that is mechanically attached to a robotic body assembly. In some embodiments, the face assembly includes a motorized assembly that is constructed to rotate the head assembly in at least one degree of freedom about a first axis in relation to the body assembly. In some embodiments, the face assembly includes a motorized assembly that is constructed to rotate the head assembly in at least two degrees of freedom about a first axis and about a second axis in relation to the body assembly.

In some embodiments, the interaction sub-system 112 includes a light emission sub-system that includes an array of lights, and the light emission sub-system is constructed to individually control each light of the light emission sub-system. In some embodiments, the interaction sub-system 112 includes a LED ring that includes an array of lights, and the LED ring is constructed to individually control each light of the LED ring.

Detection Sub-System

In some embodiments, the human reaction detection sub-system in includes an audio capture sub-system (e.g., 120 of FIG. 1B, 106d of FIG. 1D). In some embodiments, the human reaction detection sub-system 111 includes a video capture sub-system (e.g., 101c of FIG. 1C, 101d of FIG. 1D). In some embodiments, the human reaction detection sub-system 111 includes a heat detection sub-system.

In some embodiments, the audio capture sub-system includes at least one audio capture device. In some embodiments, the audio capture sub-system includes at least one microphone. In some embodiments, the audio capture sub-system includes at least one microphone array (e.g., 120 of FIG. 2B).

In some embodiments, the video capture sub-system includes at least one video capture device. In some embodiments, the video capture sub-system includes at least one camera (e.g., 101c of FIG. 1C, 101d of FIG. 1D). In some embodiments, the video capture sub-system includes at least one camera array.

In some embodiments, the human reaction detection sub-system in includes a heat detection sub-system that is constructed to detect body heat of a human. In some embodiments, the human reaction detection sub-system in includes a heat detection sub-system that is constructed to detect body temperature of a human.

In some embodiments, the human reaction detection sub-system in includes a touch sensor.

In some embodiments, the human reaction detection sub-system in includes a piezoelectric pressor sensor.

In some embodiments, the human reaction detection sub-system in includes a capacitive touch sensor.

In some embodiments, the human reaction detection sub-system in includes a resistive touch sensor.

In some embodiments, the human reaction detection sub-system in includes a blood pressure sensor.

In some embodiments, the human reaction detection sub-system in includes a heart rate sensor.

In some embodiments, the human reaction detection sub-in includes a biometric sensor.

In some embodiments, the human reaction detection sub-system 111 includes an interface (e.g., Bluetooth, NFC, WiFi, and the like) that is constructed to receive data from a remote sensor (e.g., a wearable device, such as, for example, a FitBit and an Apple Watch).

Audio System

FIG. 1B is a schematic representation of an audio-based human-machine interaction system, according to embodiments. In some embodiments, the human-machine interaction system 100b includes the adaptive behavioral control system 110, an interaction sub-system that comprises an audio output controller 131 and speakers 130, and a human reaction detection sub-system that comprises an audio input processor 121 and microphones 120, as shown in FIG. 1B. In some embodiments, the human-machine interaction system 100b is a smart speaker. In some embodiments, the human-machine interaction system 100b is an Amazon Echo smart speaker that includes an adaptive behavioral control system in accordance with embodiments disclosed herein.

In some embodiments, the audio input processor 121 is constructed to process audio data generated by each of the microphones 120 and provide processed audio data to the adaptive behavioral control system 110. In some embodiments, the adaptive behavioral control system 110 includes the audio input processor 121. In some embodiments, the audio input processor 121 is constructed to process audio data generated by each of the microphones 120 by combining the audio data of each microphone 120 into a combined audio data stream. In some embodiments, the audio input processor 121 is constructed to process audio data generated by each of the microphones 120 by selecting at least one audio data stream of the microphones 120, combining each selected data stream, the combined audio data stream of the selected data streams to the adaptive behavioral control system 110.

In some embodiments, directional information is associated with each microphone 120, and the audio input processor 121 is constructed determine a direction of captured audio based on directional information associated with a microphone 120 whose captured audio has a highest volume. In this manner, the adaptive behavioral control system 110 can use the audio input processor 121 in conjunction with the microphones 120 to determine a location of an interaction participant based on captured audio.

In some embodiments, audio output controller 131 is constructed to control the speakers 130 in accordance with data provided to the audio output controller 131 by the adaptive behavioral control system 110. In some embodiments, the audio output controller 131 is constructed to select one of the plurality of speakers 130 based on information provided by the adaptive behavioral control system 110, and control the selected speaker 130 to emit audio in accordance with data provided to the audio output controller 131 by the adaptive behavioral control system 110.

In some embodiments, directional information is associated with each speaker, and the adaptive behavioral control system 110 controls the audio output controller 131 to emit audio by using a speaker 130 that matches directional information provided by the adaptive behavioral control system. In this manner, the adaptive behavioral control system 110 can use the audio output controller 131 in conjunction with the speakers 130 to emit audio in a direction of a particular interaction participant.

In some embodiments, the adaptive behavioral control system 110 includes the audio input processor 121. In some embodiments, the adaptive behavioral control system 110 includes the audio output controller 131.

Audio and Video System

FIG. 1C is a schematic representation of an audio-and-video-based human-machine interaction system, according to embodiments. In some embodiments, the human-machine interaction system 100c includes the adaptive behavioral control system (e.g., 110), an interaction sub-system that comprises a display 102C and a speaker (not shown), and a human reaction detection sub-system that comprises a camera 101c and a microphone (not shown). In some embodiments, the human-machine interaction system 100c is a smart phone. In some embodiments, the human-machine interaction system 100c is a computer. In some embodiments, the human-machine interaction system 100c is a mobile device.

Robot

FIG. 1D is a schematic representation of a robot human-machine interaction system, according to embodiments.

In some embodiments, the human-machine interaction system 100d includes the adaptive behavioral control system (e.g., 110), an interaction sub-system that comprises a head assembly 103d and at least one appendage 105d, and a human reaction detection sub-system that comprises a camera 101d of the head assembly 103d and a microphone 106d of the head assembly 103d. In some embodiments, the head assembly 103d is mechanically attached to the body assembly 104d. In some embodiments, the head assembly 103d is mechanically attached to the body assembly 104d. In some embodiments, the human-machine interaction system 100d includes a motor assembly 163 that is constructed to rotate the head assembly 103d about a vertical axis 160d. In some embodiments, the human-machine interaction system 100d includes a motor assembly 162 that is constructed to move the head assembly 103d about a horizontal axis 161d.

In some embodiments, the head assembly 103d includes a speaker 102d.

In some embodiments, the head assembly 103d includes the adaptive behavioral control system (e.g., 110). In some embodiments, the body assembly 104d includes the adaptive behavioral control system (e.g., 110).

In some embodiments, the robot interaction system 100d includes the audio input processor 121, the audio input processor 121 is communicatively coupled to the adaptive behavioral control system of the system 100d, and the adaptive behavioral control system of the system 100d uses the audio input processor 121 to identify directions of interaction participant, as disclosed herein.

In some embodiments, the robot interaction system 100d includes the audio input processor 121, the audio input processor 121 is communicatively coupled to the adaptive behavioral control system of the system 100d, the audio input processor 121 is communicatively coupled to the microphone 106d, and the adaptive behavioral control system of the system 100d uses the audio input processor 121 to identify directions of interaction participant, based on volume of audio captured by the microphone 106d and a current position of the motor 163.

In some embodiments, the robot interaction system 100d includes the audio input processor 121, the audio input processor 121 is communicatively coupled to the adaptive behavioral control system of the system 100d, the audio input processor 121 is communicatively coupled a microphone array that includes a plurality of microphones arranged in different directions, and the adaptive behavioral control system of the system 100d uses the audio input processor 121 to identify directions of interaction participants, based on volumes of audio captured by the microphones of the microphone array. In some embodiments, the body assembly 104d includes the microphone array.

In some embodiments, the head assembly 103d includes the microphone array, the microphone array is rotated along with the head assembly 103d by the motor 163, and the adaptive behavioral control system of the system 100d uses rotational position information of the motor 163 to identify directions of interaction participants. In some embodiments, the head assembly 103d includes the microphone array, the microphone array is rotated along with the head assembly 103d by the motor 162, and the adaptive behavioral control system of the system 100d uses rotational position information of the motor 162 to identify directions of interaction participants. In some embodiments, the robot system 100d includes a GPS receiver, and the adaptive behavioral control system of the system 100d uses information of the GPS receiver to identify directions of interaction participants. In some embodiments, the robot system 100d includes an Inertial Measurement Unit (IMU), and the adaptive behavioral control system of the system 100d uses information of the IMU to identify directions of interaction participants. In some embodiments, the robot system 100d includes an accelerometer, and the adaptive behavioral control system of the system 100d uses information of the accelerometer to identify directions of interaction participants.

Computer-Behavioral Policy

In some embodiments, the adaptive behavioral control system (e.g., 110) stores computer-readable data of computer-behavioral policy.

In some embodiments, the adaptive behavioral control system (e.g., 110) stores computer-readable data of a computer-behavioral policy for each interaction participant detected by the adaptive behavioral control system.

In some embodiments, the adaptive behavioral control system (e.g., 110) stores computer-readable data of a computer-behavioral policy for each of a plurality of interaction participants. In some embodiments, the adaptive behavioral control system (e.g., 110) stores an identical computer-behavioral policy for each interaction participant. In some embodiments, the adaptive behavioral control system (e.g., 110) updates the computer-behavioral policy for each interaction participant independently.

In some embodiments, the adaptive behavioral control system (e.g., 110) updates a computer-behavioral policy based on human reactions detected for the participant associated with the computer-behavioral policy. In some embodiments, the adaptive behavioral control system (e.g., 110) updates a computer-behavioral policy based on human reactions detected from the participant associated with the computer-behavioral policy. In some embodiments, computer-behavioral policy specifies the same actions for a first action type. In some embodiments, computer-behavioral policy specifies the different actions for a first action type. In some embodiments, the computer-behavioral policies of each participant are initialized with the same weight values. In some embodiments, the computer-behavioral policies of each participant are initialized with the same weighted sequence. In some embodiments, independent updating of the computer-behavioral policies of each participant results in at least two computer-behavioral policies having different weighted sequences. In some embodiments, independent updating of the computer-behavioral policies of each participant results in at least two computer-behavioral policies having different weight values.

In some embodiments, the data for the computer-behavioral policy includes instructions for performing an action of an action type. In some embodiments, the data for the computer-behavioral policy includes an identifier of an action of a particular type of action (an action type) and a corresponding weight value used to determine when to perform the action. In some embodiments, the data for the computer-behavioral policy includes an identifier of an action of a particular type of action (an action type) and a corresponding weight value used to determine when to prioritize the action. In some embodiments, the data for the computer-behavioral policy includes an identifier of an action of an action type and a corresponding weighted sequence of actions of the action type that is used to determine when to perform the action. In some embodiments, the data for the computer-behavioral policy includes computer-executable instructions of an action of an action type and a corresponding weight value used to determine when to perform the action. In some embodiments, the data for the computer-behavioral policy includes computer-executable instructions of an action of an action type and a corresponding weighted sequence of actions of the action type that is used to determine when to perform the action. In some embodiments, the data for the computer-behavioral policy includes a link to computer-executable instructions of an action of an action type and a corresponding weight value used to determine when to perform the action. In some embodiments, the data for the computer-behavioral policy includes a link to computer-executable instructions of an action of an action type and a corresponding weighted sequence of actions of the action type that is used to determine when to perform the action.

In some embodiments, the data for the computer-behavioral policy includes data for detected human reactions of interaction participants corresponding to performance of actions of the first action type. In some embodiments, the data for a detected human reaction is data indicating a detected emotion of an interaction participant. In some embodiments, the data for a detected human reaction is data indicating a classification of a detected emotion of an interaction participant. In some embodiments, the classification of a detected emotion of an interaction participant is one of "positive" and "negative". In some embodiments, the classification of a detected emotion of an interaction participant is one of "positive", "negative", and "neutral". In some embodiments, the classification of a detected emotion of an interaction participant is one a plurality of a plurality of reaction values. In some embodiments, a reaction value is an integer with a range (e.g., 0-100) or a float value with a range (e.g., 0.0-1.0), with reaction values ordered from negative to positive. In some embodiments, a reaction value is a binary value indicating either a "positive" or a "negative" reaction.

FIGS. 3A-E are representations of exemplary computer-behavioral policies.

Figure 3A:
FIGS. 3A-E are representations of exemplary policies, according to embodiments.

FIG. 3A depicts an exemplary computer-behavioral policy for a first action type ("Action A"). In some embodiments, the first action type is an action type that is performed during execution of a human-machine interaction application that specifies performance of a plurality of actions in accordance with an interaction session. In some embodiments, the human-machine interaction application specifies performance of several instances of an action of the first action type. In some embodiments, the human-machine interaction application specifies performance of actions of several action types. According to FIG. 3A, three alternative actions are defined for Action Type A, namely Action A, Action B, and Action C. FIG. 3A depicts an initial policy for which no human reactions have been detected. In some embodiments, during generation of the policy of 301 of FIG. 3A, weight values for each action of the Action Type A are specified, and these weight values are used to generate a weighted sequence used to select an action (Action A, Action B, or Action C) of the Action Type A (the first action type). In some embodiments, the weighted sequence of FIG. 3A specifies that Action A is to be performed seven times, followed by Action B two times, and thereafter Action C one time, before the sequence repeats.

Figure 3B:

FIG. 3B depicts an updated policy 302 that is an updated version of the policy 301 of FIG. 3A after ten reactions have been detected for each action of the first action type (Action Type A). As shown in FIG. 3B, Action A has received two positive reactions, Action B has received two positive reaction, and Action C has received six positive reactions.

Figure 3C:

FIG. 3C depicts an updated policy 303 after the recorded human reactions for the Action Type A have satisfied an update condition. As shown in FIG. 3C, the weight values have been updated, and the corresponding weighted sequence has been updated to reflect the distribution of positive reactions recorded for Actions A, B and C.

Figure 3D:

FIG. 3D depicts an updated policy 304 that is an updated version of the policy 303 of FIG. 3C after twenty reactions have been detected for each action of the first action type (Action Type A). As shown in FIG. 3D, Action A has received ten positive reactions, Action B has received 3 positive reaction, and Action C has received 7 positive reactions.

Figure 3E:

FIG. 3E depicts an updated policy 305 after the recorded human reactions for the Action Type A have satisfied an update condition based on the positive reactions depicted in FIG. 3D. As shown in FIG. 3E, the weight values have been updated, and the corresponding weighted sequence has been updated to reflect the distribution of positive reactions recorded for Actions A, B and C.

Methods

Method 400

Figure 4:
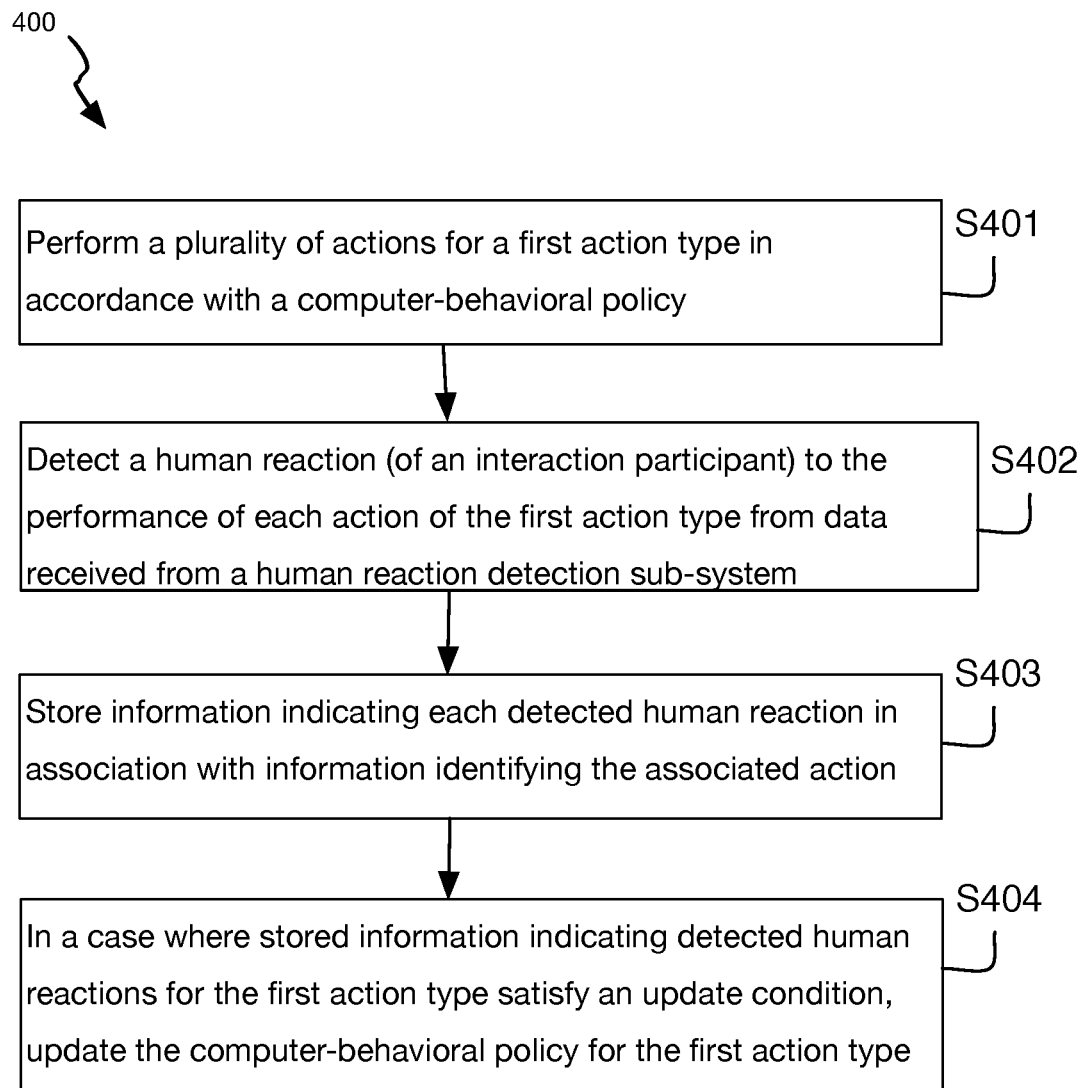
FIGS. 4-7 are representations of methods, according to embodiments.

FIG. 4 is a representation of a method according to embodiments. In some embodiments, a human-machine interaction system performs the method 400. In some embodiments, the human-machine interaction system of FIG. 1A performs the method 400. In some embodiments, the human-machine interaction system of FIG. 1B performs the method 400. In some embodiments, the human-machine interaction system of FIG. 1C performs the method 400. In some embodiments, the human-machine interaction system of FIG. 1D performs the method 400.

In some embodiments, the method 400 includes: an adaptive behavioral control system (of a human-machine interaction system) controlling an interaction sub-system (e.g., 112 of FIG. 1A) to perform a plurality of actions for a first action type in accordance with a computer-behavioral policy (e.g., 802 and 803 of FIG. 8), each action being a different alternative action for the action type (process S401); the adaptive behavioral control system detecting a human reaction (of an interaction participant, e.g., 810, 820 of FIG. 8) to the performance of each action of the first action type from data received from a human reaction detection sub-system (e.g., 111 of FIG. 1A) (process S402); and the adaptive behavioral control system storing information indicating each detected human reaction in association with information identifying the associated action (process S403). In some embodiments, the method 400 incudes; in a case where stored information indicating detected human reactions for the first action type satisfy an update condition, the adaptive behavioral control system updating the computer-behavioral policy for the first action type (process S404).

In some embodiments, the method 400 incudes; responsive to user-input received from an operator device communicatively coupled to the adaptive behavioral control system via a network interface (e.g., 211), the adaptive behavioral control system updating the computer-behavioral policy for the first action type based on the received user-input.

External Human-Machine Interaction Systems

In some embodiments, the method 400 includes the adaptive behavioral control system storing information indicating human reactions detected by an external human-machine interaction system for performance of an action of the first action type by the external human-machine interaction system, and the adaptive behavioral control system stores the information detected by the external behavioral control system in association with information identifying the associated action. In this manner, the adaptive behavioral control system updates the policy used by the adaptive behavioral control system based on human reactions detected by external human-machine interaction systems as well as the human-machine interaction system of the adaptive behavioral control system.

Weighted Sequences

In some embodiments, the policy specifies a weighted sequence of the plurality of actions for the first action type, and the adaptive behavioral control system controls the interaction sub-system to perform the plurality of actions for the first action type in accordance with the weighted sequence for the first action type. As a first example, the following is an exemplary evenly weighted sequence of actions A, B and C: {A, B, C, A, B, C, . . .}. As a second example, the following is an exemplary weighted sequence of actions A, B and C in which weight values of A, B and C are 70, 20% and 10%, respectively: {A, A, A, A, A, A, A, B, B, C, A, A, A, A, A, A, B, B, C, . . . }. As a third example, In some embodiment, the following is an exemplary weighted sequence of actions A, B and C in which weight values of A, B and C are 70, 20% and 10%, respectively, in which each action is sampled from a distribution: {C, A, A, A, C, B, A, A, A, A, B, C}.

Policy Selection

In some embodiments, the method 400 includes: the adaptive behavioral control system selecting the computer-behavioral policy based on at least one of an identified interaction participant, a determined current interaction context, an action type, a current therapeutic goal, and a determined current therapy type. In some embodiments, the method 400 includes: the adaptive behavioral control system selecting the computer-behavioral policy based on a current therapeutic goal. In some embodiments, the method 400 includes: the adaptive behavioral control system determining the current therapy type being used during interaction with at least one participant, and selecting the computer-behavioral policy based on the determined current therapy type. In some embodiments, the current therapy type includes at least one of ABA (Applied Behavioral Analysis), OT (Occupational Therapy), and MI (Motivational Interviewing) therapy. In some embodiments, the method 400 includes: the adaptive behavioral control system identifying at least a first interaction participant, and selecting the computer-behavioral policy based on the identified first interaction participant. In some embodiments, the method 400 includes: the adaptive behavioral control system determining the current interaction context, and selecting the computer-behavioral policy based on the determined current interaction context. In some embodiments, the current interaction context includes one of a date, a location, an occasion (e.g., birthday), an event (e.g., funeral), a detected overall human emotion of at least one interaction participant (e.g., the participant seems happy or sad today), a detected human mood of at least one interaction participant.

In some embodiments, adaptive behavioral control system includes a plurality of computer-behavioral policies. In some embodiments, adaptive behavioral control system includes a computer-behavioral policy for each of a plurality of interaction participants. In some embodiments, adaptive behavioral control system includes a computer-behavioral policy for each of a plurality of therapy types. In some embodiments, adaptive behavioral control system includes a computer-behavioral policy for each of a plurality of interaction contexts. In some embodiments, adaptive behavioral control system includes a computer-behavioral policy for each of a plurality of interaction contexts for at least one interaction participant. In some embodiments, adaptive behavioral control system includes a computer-behavioral policy for each of a plurality of therapy types for at least one interaction participant. In some embodiments, adaptive behavioral control system includes a computer-behavioral policy for each of a plurality of interaction contexts for each of a plurality of interaction participants. In some embodiments, adaptive behavioral control system includes a computer-behavioral policy for each of a plurality of therapy types for each of a plurality of interaction participants.

In some embodiments, adaptive behavioral control system includes a computer-behavioral policy for each of a plurality of therapeutic goals for each of a plurality of interaction participants. In some embodiments, adaptive behavioral control system includes a computer-behavioral policy for each of a plurality of therapeutic goals for at least one interaction participant.

In some embodiments, the adaptive behavioral control system stores information indicating each detected human reaction in association with the selected computer-behavioral policy, and the adaptive behavioral control system provides information indicating each detected human reaction for the selected policy to an external system in response to a request provide by the external system via an API of the adaptive behavioral control system.

Perform a Plurality of Actions for a First Action Type in Accordance With a Computer-Behavioral Policy (Process S401)

In some embodiments, controlling the interaction sub-system to perform a plurality of actions for a first action type in accordance with the computer-behavioral policy includes: controlling the interaction sub-system (e.g., 112, 131, 130, 102c, 102d, 103d, 105d, 106d) to perform a first action for the first action type based on weight values of the actions for the first action type included in the policy. In some embodiments, for a first instance of performing an action for the first action type, the adaptive behavioral control system (e.g., 110) selects the action having a highest weight value (as specified in the policy) and performs the selected action. In some embodiments, for a first instance of performing an action for the first action type, the adaptive behavioral control system (e.g., 110) randomly selects an action and performs the selected action.

In some embodiments, controlling the interaction sub-system (e.g., 112) to perform a plurality of actions for a first action type in accordance with the computer-behavioral policy includes: controlling the interaction sub-system to perform a first action for the first action type based on weight values of the actions for the first action type included in the policy and log information indicating actions previously performed by the human-machine interaction system for the first action type.

In some embodiments, controlling the interaction sub-system to perform a plurality of actions for a first action type in accordance with the computer-behavioral policy includes: controlling the interaction sub-system to select an action for the first action type based on a weighted sequence of the plurality of actions for the first action type. For example, the following is an exemplary evenly weighted sequence of actions A, B and C: {A, B, C, A, B, C, . . . }. For example, the following is an exemplary weighted sequence of actions A, B and C in which weight values of A, B and C are 70, 20% and 10%, respectively: {A, A, A, A, A, A, A, B, B, C, A, A, A, A, A, A, A, B, B, C, . . . }.

Actions and Action Types

In some embodiments, an action type is a type of human interaction, such as, for example, a greeting, an acknowledgment, a gesture, a question, a statement, a reaction, an expression, and the like. In some embodiments, for at least one action type (e.g., a Greeting action type), the computer-behavioral policy specifies a plurality of alternative actions. In some embodiments, the plurality of alternative actions includes different actions for the action type (e.g., greeting actions). In some embodiments, the plurality of alternative actions includes different audible actions for the action type (e.g., greeting actions). In some embodiments, audible actions include actions performed by controlling a speaker (e.g., 130, 102d). In some embodiments, the plurality of alternative actions includes different physical movement actions for the action type (e.g., greeting actions). In some embodiments, physical movement actions include actions performed by controlling a motor (e.g., 162, 163 of FIG. 1D). In some embodiments, physical movement actions include actions performed by controlling a robot appendage (e.g., 105d FIG. 1D). In some embodiments, physical movement actions include actions performed by controlling a robot head assembly (e.g., 103d FIG. 1D). In some embodiments, physical movement actions include actions performed by controlling a robot body assembly (e.g., 104d FIG. 1D). In some embodiments, the plurality of alternative actions includes different displayable actions for the action type (e.g., greeting actions) (presented by a display device). In some embodiments, displayable actions include actions performed by controlling a display device (e.g., 1052c FIG. 1C).

In some embodiments, the plurality of alternative actions include at least two actions for emission of audible sound at different volumes by controlling an audio output sub-system (e.g., 130, 102d).

In some embodiments, the plurality of alternative actions include at least two actions for emission of audible sound at different playback rates by controlling an audio output sub-system.

In some embodiments, the plurality of alternative actions include at least two actions for emission of spoken word sounds at different speeds by controlling an audio output sub-system.

In some embodiments, the plurality of alternative actions include at least two actions for emission of different sounds by controlling an audio output sub-system.

In some embodiments, the plurality of alternative actions include at least two actions for emission of audible output using different voices by controlling an audio output sub-system.

In some embodiments, the plurality of alternative actions include at least two actions for emission of audible output corresponding to spoken words using different vocal tones by controlling an audio output sub-system.

In some embodiments, the plurality of alternative actions include at least two actions for emission of audible output corresponding to spoken words corresponding to different verbal instructions by controlling an audio output sub-system.

In some embodiments, the plurality of alternative actions include at least two actions for display of different images by controlling a video display sub-system (e.g., 102c).

In some embodiments, the plurality of alternative actions include at least two actions for performing different physical gestures by controlling a mechanical robotic sub-system (e.g., 103d, 104d, 105d, 162, 163).

In some embodiments, the plurality of alternative actions include at least two actions for performing different physical gestures by controlling a mechanical robotic sub-system that includes at least one robotic appendage (e.g., 105d).

In some embodiments, the plurality of alternative actions include at least two actions for performing different physical gestures by controlling a mechanical robotic sub-system that includes at least one robotic appendage (e.g., 105d), a robotic head assembly (e.g., 103d) that is mechanically attached to a robotic body assembly (e.g., 104d), wherein the head assembly includes a motorized assembly (e.g., motor 162, 163) that is constructed to rotate the head assembly in at least one degree of freedom in relation to the body assembly.

In some embodiments, the plurality of alternative actions include at least one action performed by controlling a light emission sub-system that includes an array of lights, wherein the light emission sub-system is constructed to individually control each light of the light emission sub-system.

In some embodiments, the plurality of alternative actions include at least one action performed by controlling a LED ring that includes an array of lights, wherein the LED ring is constructed to individually control each light of the LED ring.

In some embodiments, the plurality of alternative actions include at least one action performed by controlling an audio output sub-system. In some embodiments, the plurality of alternative actions include at least one action performed by controlling an audio output sub-system and a video output sub-system. In some embodiments, the plurality of alternative actions include at least one action performed by controlling an audio output sub-system. In some embodiments, the plurality of alternative actions include at least one action performed by controlling an audio output sub-system, a video output sub-system, and a mechanical robotic sub-system.

In some embodiments, the plurality of alternative actions include at least one action performed by controlling at least one of audio output sub-system, a video output sub-system, and a mechanical robotic sub-system.

In some embodiments, the plurality of alternative actions include at least one action performed by controlling at least one of audio output sub-system, a video output sub-system, a mechanical robotic sub-system, a light emission sub-system, and a LED ring.

In some embodiments, the plurality of alternative actions include at least one action for performing a facial expression by controlling a robotic head assembly (e.g., 103d). In some embodiments, the head assembly includes at least one mechanical facial feature, and the robotic head assembly is constructed to control movement of the at least one mechanical facial feature to perform at least one facial expression. In some embodiments, the head assembly includes at least one display device, and the robotic head assembly is constructed to control display of the display device to perform at least one facial expression. In some embodiments, the head assembly includes at least one light emission subsystem, and the robotic head assembly is constructed to control light emission of the light emission display system to perform at least one facial expression. In some embodiments, the head assembly includes at least one LED ring, and the robotic head assembly is constructed to control at least one LED of the LED ring to perform at least one facial expression.

In some embodiments, the plurality of alternative actions include at least one action for a robotic head assembly (e.g., 103d) to output audio in a particular voice, by controlling an audio output sub-system of the robotic head assembly. In some embodiments, the plurality of alternative actions include at least one action for a robotic head assembly (e.g., 103d) to output audible speech, by controlling an audio output sub-system of the robotic head assembly.

Detecting a Human Reaction (Process S402)

Reaction Detection

In some embodiments, the adaptive behavioral control system detecting a human reaction (process S402) includes detecting a human reaction to the performance of the first action by an interaction participant (e.g., 810, 820 of FIG. 8) from data received from the human reaction detection sub-system (e.g., in of FIG. 1A, 120 and 121 of FIG. 1B, 101c of FIG. 1C, 101d and 106d of FIG. 1D).

In some embodiments, the adaptive behavioral control system is constructed to detect a human reaction by using a gesture detection system that identifies human gestures based on video data of the interaction participant provided by the human reaction detection sub-system. In some embodiments, the adaptive behavioral control system includes a data structure that associates human gestures with one of a positive human reaction and a negative human reaction.

In some embodiments, the adaptive behavioral control system is constructed to detect a human reaction by using a smile detection system that identifies human gestures based on video data of the interaction participant provided by the human reaction detection sub-system.

Emotion Detection

In some embodiments, the adaptive behavioral control system detecting a human reaction (process S402) includes using an emotion detection system (e.g., 279 of FIG. 2) to detect a human reaction to the performance of the first action by an interaction participant (e.g., 810, 820 of FIG. 8) from data received from the human reaction detection sub-system (e.g., in of FIG. 1A, 120 and 121 of FIG. 1B, 101c of FIG. 1C, 101d and 106d of FIG. 1D). In some embodiments, the detected human reaction is a detected emotion. In some embodiments, the emotion detection system is included in the human-machine interaction system. In some embodiments, the emotion detection system is included in the adaptive behavioral control system. In some embodiments, the emotion detection system is included in the human reaction detection sub-system. In some embodiments, the emotion detection system is an external system that is communicatively coupled to the human-machine interaction system via a network interface of the human-machine interaction system. In some embodiments, the emotion detection system is a cloud-based system that is accessible via an Application Programming Interface (API). In some embodiments, the emotion detection system is an Amazon® emotion detection system. In some embodiments, the emotion detection system is a Microsoft® emotion detection system. In some embodiments, the emotion detection system is an IBM® emotion detection system. In some embodiments, the emotion detection system is a Google® emotion detection system. In some embodiments, the emotion detection system is an Affectiva® emotion detection system. In some embodiments, the emotion detection system is a Cogito® emotion detection system. In some embodiments, the emotion detection system is constructed to detect an emotion based on captured image data. In some embodiments, the emotion detection system is constructed to detect an emotion based on captured audio data. In some embodiments, the emotion detection system is constructed to detect an emotion based on captured image data and captured audio data. In some embodiments, the emotion detection system includes an audible emotion detection sub-system that is constructed to detect an emotion based on captured audio data. In some embodiments, the emotion detection system includes a visible emotion detection sub-system that is constructed to detect an emotion based on captured image data. In some embodiments, emotions detectable by the emotion detection system include anger, contempt, disgust, fear, happiness, neutral, sadness, and surprise. In some embodiments, emotions detectable by the emotion detection system include happy, sad, angry, confused, disgusted, surprised, calm, unknown. In some embodiments, the emotion detection system is constructed to classify detected emotions as either positive, negative, or neutral. In some embodiments, the adaptive behavioral control system uses the emotion detection system obtain a determined emotion classification (e.g., positive, neutral, negative) after performance of an action of the first action type, and store the determined emotion classification in association with the performed action.

Storing Information Indicating Each Detected Human Reaction (Process S403)

In some embodiments, the adaptive behavioral control system storing information indicating each detected human reaction (process S403) includes storing data indicating each detected emotion. In some embodiments, the adaptive behavioral control system storing information indicating each detected human reaction (process S403) includes determining a classification of each detected emotion, and storing data indicating the classification of each detected emotion. In some embodiments, the classification of a detected emotion of an interaction participant is one of "positive" and "negative". In some embodiments, the classification of a detected emotion of an interaction participant is one of "positive", "negative", and "neutral".

In some embodiments, the adaptive behavioral control system storing information indicating each detected human reaction (process S403) includes: for each detected human reaction, determining whether the reaction relates to at least one therapeutic goal, and storing data indicating each therapeutic goal related to the detected human reaction.

In some embodiments, at least one therapeutic goal is a short term interaction goal (e.g., smiles back at robot). In some embodiments, at least one therapeutic goal is a long term goal (e.g., manifesting long-term behavior skills).

In some embodiments, the adaptive behavioral control system storing information indicating each detected human reaction (process S403) includes: for each detected human reaction, determining whether the reaction relates to at least one interaction goal, and storing data indicating each interaction goal related to the detected human reaction.

In some embodiments, at least one interaction goal is a short term interaction goal (e.g., smiles back at robot). In some embodiments, at least one interaction goal is a long term goal (e.g., manifesting long-term behavior skills).

Updating the Computer-Behavioral Policy for the First Action Type (Process S404)

In some embodiments, the policy (e.g., 301-305) specifies a weighted sequence of the plurality of actions for the first action type, and the adaptive behavioral control system controls the interaction sub-system to perform the plurality of actions for the first action type in accordance with the weighted sequence for the first action type. In some embodiments, the adaptive behavioral control system storing information indicating each detected human reaction (process S403) includes determining a classification of each detected emotion, and storing data indicating the classification of each detected emotion (e.g., "positive", "negative", and "neutral").

In some embodiments, updating the computer-behavioral policy for the first action type (process S404) includes: determining whether a distribution of detected positive human emotions stored for the actions of the first action type differs from the distribution of the actions in the weighted sequence of actions for the first action above a difference threshold based on results of a distribution comparison; and updating the computer-behavioral policy for the first action type responsive to a determination that the distribution of detected positive human emotions stored for the actions of the first action type differs from the distribution of the actions in the weighted sequence of actions for the first action above the difference threshold.

In some embodiments, updating the computer-behavioral policy for the first action type (process S404) includes: determining whether a distribution of detected negative human emotions stored for the actions of the first action type differs from the distribution of the actions in the weighted sequence of actions for the first action above a difference threshold based on results of a distribution comparison; and updating the computer-behavioral policy for the first action type responsive to a determination that the distribution of detected negative human emotions stored for the actions of the first action type differs from the distribution of the actions in the weighted sequence of actions for the first action above the difference threshold.

In some embodiments, updating the computer-behavioral policy for the first action type (process S404) includes: determining whether a distribution of detected human reactions related to a therapeutic goal from among the stored human reaction information for the actions of the first action type differs from the distribution of the actions in the weighted sequence of actions for the first action above a difference threshold based on results of a distribution comparison; and updating the computer-behavioral policy for the first action type responsive to a determination that the distribution of reactions related to the therapeutic goal for the actions of the first action type differs from the distribution of the actions in the weighted sequence of actions for the first action above the difference threshold.

In some embodiments, updating the computer-behavioral policy for the first action type (process S404) includes: determining whether a distribution of detected human reactions related to any one of a plurality of therapeutic goals from among the stored human reaction information for the actions of the first action type differs from the distribution of the actions in the weighted sequence of actions for the first action above a difference threshold based on results of a distribution comparison; and updating the computer-behavioral policy for the first action type responsive to a determination that the distribution of reactions related to any one of a plurality of therapeutic goals for the actions of the first action type differs from the distribution of the actions in the weighted sequence of actions for the first action above the difference threshold.

In some embodiments, the distribution comparison is performed after a predetermined number of iterations of the sequence are performed. In some embodiments, the distribution comparison is performed periodically at regular time intervals. In some embodiments, the distribution comparison is performed after a predetermined number of positive human emotions have been recorded. In some embodiments, the distribution comparison is performed after a predetermined number of positive human emotions have been recorded for a particular action of the first action type.

In some embodiments, the distribution comparison is performed after a predetermined number of negative human emotions have been recorded. In some embodiments, the distribution comparison is performed after a predetermined number of negative human emotions have been recorded for a particular action of the first action type.

In some embodiments, the distribution comparison is performed after a predetermined number of human reactions have been recorded for at least one therapeutic goal. In some embodiments, the distribution comparison is performed after a predetermined number of human reactions have been recorded for at least one therapeutic goal of the first action type.

In some embodiments, the distribution comparison is performed after a predetermined number of human reactions have been recorded for at least one interaction goal. In some embodiments, the distribution comparison is performed after a predetermined number of human reactions have been recorded for at least one interaction goal of the first action type.

For example, in a weighted sequence having a distribution of Action A (70%), Action B (20%), Action C (10%), in a case where positive reactions are recorded as Action A (10%), Action B (20%), Action C (70%), the computer-behavioral policy is updated for the first action type. In some embodiments, the weighted sequence is updated such that the distribution of actions within the sequence matches the distribution of positive reactions recorded for the actions of the first action type. In some embodiments, the weighted sequence is updated such that the distribution of actions within the sequence is incrementally adjusted based on the distribution of positive reactions recorded for the actions of the first action type.

In some embodiments, updating the computer-behavioral policy for the first action type (process S404) includes: determining whether a predetermined number of consecutive positive human emotions have been detected for at least one action of the first action type; and updating the computer-behavioral policy for the first action type responsive to a determination that the predetermined number of consecutive positive human emotions have been detected for at least one action of the first action type.

In some embodiments, updating the computer-behavioral policy for the first action type (process S404) includes: determining whether a predetermined number of consecutive positive human reactions have been detected for at least one action of the first action type; and updating the computer-behavioral policy for the first action type responsive to a determination that the predetermined number of consecutive positive human reactions have been detected for at least one action of the first action type.

Method 500

Figure 5:
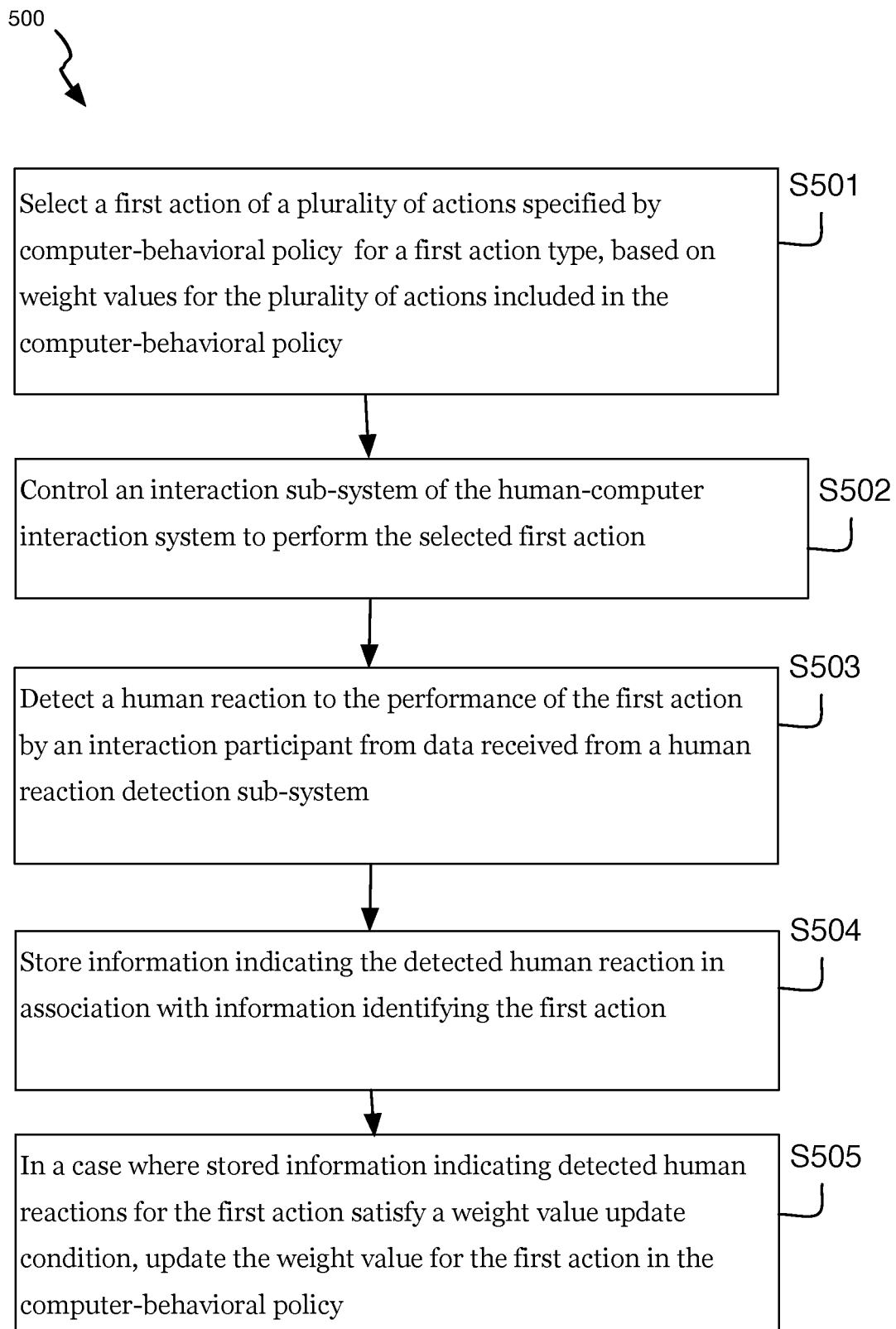

FIG. 5 is a representation of a method according to embodiments. In some embodiments, a human-machine interaction system performs the method 500. In some embodiments, the human-machine interaction system of FIG. 1A performs the method 500. In some embodiments, the human-machine interaction system of FIG. 1B performs the method 500. In some embodiments, the human-machine interaction system of FIG. 1C performs the method 500. In some embodiments, the human-machine interaction system of FIG. 1D performs the method 500.

In some embodiments, the method 500 includes: an adaptive behavioral control system (e.g., 110 of FIG. 1A) (of a human-machine interaction system, e.g., 100a, 100b, 100c, 100d) selecting a first action of a plurality of actions specified by a computer-behavioral policy (e.g., 301-305 of FIGS. 3A-E) for a first action type, based on weight values for the plurality of actions included in the computer-behavioral policy (process S501); the adaptive behavioral control system controlling an interaction sub-system (e.g., 112 of FIG. 1A) of the human-machine interaction system to perform the selected first action (process S502); the adaptive behavioral control system detecting a human reaction to the performance of the first action by an interaction participant (e.g., 810, 820 of FIG. 8) from data received from a human reaction detection sub-system (e.g., 111 of FIG. 1A) of the human-machine interaction system (process S503); and the adaptive behavioral control system storing information indicating the detected human reaction in association with information identifying the first action (process S504). In some embodiments, the method 500 includes: in a case where stored information indicating detected human reactions for the first action satisfy an update condition, the adaptive behavioral control system updating the weight value for the first action in the computer-behavioral policy (process S505). In some embodiments, the method 500 includes: responsive to user-input received from an operator device communicatively coupled to the adaptive behavioral control system via a network interface (e.g., 211), the adaptive behavioral control system updating the weight value for the first action in the computer-behavioral policy based on the received user-input.

In some embodiments, process S502 is similar to process S401 of FIG. 4. In some embodiments, process S503 is similar to process S402 of FIG. 4. In some embodiments, process S504 is similar to process S403 of FIG. 4. In some embodiments, process S505 is similar to process S404 of FIG. 4.

Policy Selection

In some embodiments, the method 500 includes: the adaptive behavioral control system selecting the computer-behavioral policy based on at least one of an identified interaction participant, a determined current interaction context, an action type, a current therapeutic goal, and a determined current therapy type.

In some embodiments, the method 500 includes: the adaptive behavioral control system selecting the computer-behavioral policy based on a current therapeutic goal.

In some embodiments, the method 500 includes: the adaptive behavioral control system determining the current therapy type being used during interaction with at least one participant, and selecting the computer-behavioral policy based on the determined current therapy type. In some embodiments, the current therapy type includes at least one of ABA (Applied Behavioral Analysis), OT (Occupational Therapy), and MI (Motivational Interviewing) therapy. In some embodiments, the method 500 includes: the adaptive behavioral control system identifying at least a first interaction participant, and selecting the computer-behavioral policy based on the identified first interaction participant. In some embodiments, the method 500 includes: the adaptive behavioral control system determining the current interaction context, and selecting the computer-behavioral policy based on the determined current interaction context. In some embodiments, the current interaction context includes one of a date, an occasion (e.g., birthday), an event (e.g., funeral), a detected overall human emotion of at least one interaction participant (e.g., the participant seems happy or sad today).

In some embodiments, adaptive behavioral control system includes a plurality of computer-behavioral policies. In some embodiments, adaptive behavioral control system includes a computer-behavioral policy for each of a plurality of interaction participants. In some embodiments, adaptive behavioral control system includes a computer-behavioral policy for each of a plurality of therapy types. In some embodiments, adaptive behavioral control system includes a computer-behavioral policy for each of a plurality of interaction contexts. In some embodiments, adaptive behavioral control system includes a computer-behavioral policy for each of a plurality of interaction contexts for at least one interaction participant. In some embodiments, adaptive behavioral control system includes a computer-behavioral policy for each of a plurality of therapy types for at least one interaction participant. In some embodiments, adaptive behavioral control system includes a computer-behavioral policy for each of a plurality of interaction contexts for each of a plurality of interaction participants. In some embodiments, adaptive behavioral control system includes a computer-behavioral policy for each of a plurality of therapy types for each of a plurality of interaction participants.

In some embodiments, adaptive behavioral control system includes a computer-behavioral policy for each of a plurality of therapeutic goals for each of a plurality of interaction participants. In some embodiments, adaptive behavioral control system includes a computer-behavioral policy for each of a plurality of therapeutic goals for at least one interaction participant.

In some embodiments, the adaptive behavioral control system stores information indicating each detected human reaction in association with the selected computer-behavioral policy, and the adaptive behavioral control system provides information indicating each detected human reaction for the selected policy to an external system in response to a request provide by the external system via an API of the adaptive behavioral control system.

Method 600

Figure 6:
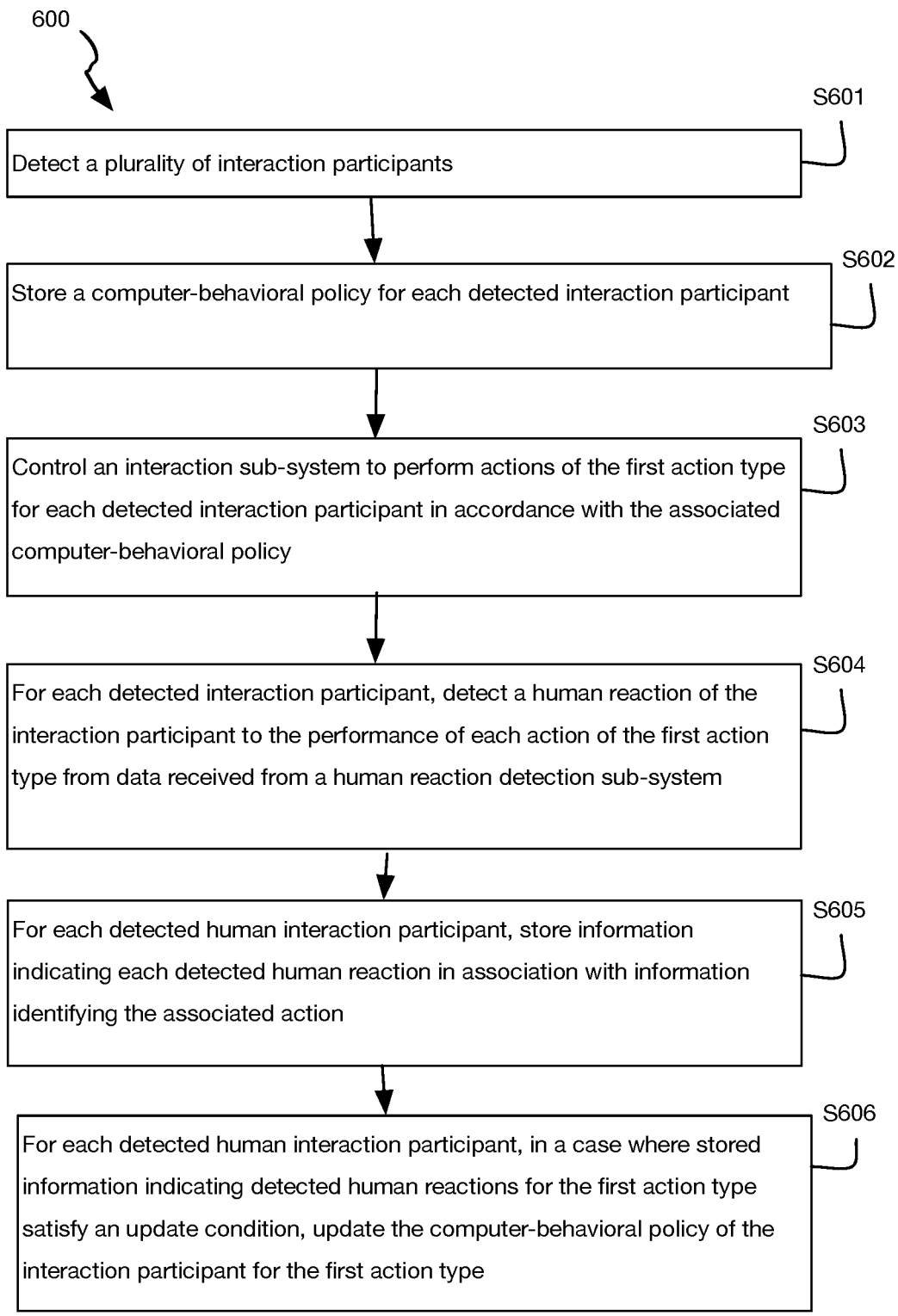

FIG. 6 is a representation of a method according to embodiments. In some embodiments, a human-machine interaction system performs the method 600. In some embodiments, the human-machine interaction system of FIG. 1A performs the method 600. In some embodiments, the human-machine interaction system of FIG. 1B performs the method 600. In some embodiments, the human-machine interaction system of FIG. 1C performs the method 600. In some embodiments, the human-machine interaction system of FIG. 1D performs the method 600.

In some embodiments, the method 600 includes: an adaptive behavioral control system of a human-machine interaction system detecting a plurality of interaction participants (e.g., 810, 820 of FIG. 8) by using at least one of a heat detection sub-system, a video capture sub-system, an audio capture sub-system, a touch sensor, a piezoelectric pressor sensor, a capacitive touch sensor, a resistive touch sensor, a blood pressure sensor, a heart rate sensor, and a biometric sensor (process S601); the adaptive behavioral control system storing at least one computer-behavioral policy (e.g., 802, 803 of FIG. 8) for each detected interaction participant (S602); the adaptive behavioral control system controlling an interaction sub-system (e.g., 112, 131, 130, 102*c*, 102*d*, 103*d*, 105*d*, 106*d*) to perform actions of a first action type for each detected interaction participant in accordance with a selected computer-behavioral policy for the interaction participant(S603); for each detected interaction participant, the adaptive behavioral control system detecting a human reaction of the interaction participant to the performance of each action of the first action type from data received from a human reaction detection sub-system (e.g., 111 of FIG. 1A, 120 and 121 of FIG. 1B, 101*c* of FIG. 1C, 101*d* and 106*d* of FIG. 1D) (S604); and for each detected human interaction participant, the adaptive behavioral control system storing information indicating each detected human reaction in association with information identifying the associated action (S605). In some embodiments, the method 600 includes: for each detected human interaction participant, in a case where stored information indicating detected human reactions for the first action type satisfy an update condition, the adaptive behavioral control system updating the selected computer-behavioral policy of the interaction participant for the first action type (S606).

In some embodiments, the method 600 includes; responsive to user-input received from an operator device communicatively coupled to the adaptive behavioral control system via a network interface (e.g., 211), the adaptive behavioral control system updating at least one computer-behavioral policy based on the received user-input.

The computer-behavioral policy of each detected interaction participant is independently updated based on detected human reactions for the associated interaction participant.

In some embodiments, the adaptive behavioral control system stores at least a first computer-behavioral policy for a first interaction participant and a second computer-behavioral policy for a second interaction participant, the first policy and the second policy each specifying a same plurality of actions for the first action type, each action being a different alternative action for the action type.

In some embodiments, process S603 is similar to process S401 of FIG. 4. In some embodiments, process S604 is similar to process S402 of FIG. 4. In some embodiments, process S605 is similar to process S403 of FIG. 4. In some embodiments, process S606 is similar to process S404 of FIG. 4.

Policy Selection

In some embodiments, the method 600 includes: the adaptive behavioral control system selecting a computer-behavioral policy for each detected interaction participant based on at least one of an identity of the interaction participant, a determined current interaction context for the interaction participant, an action type, a current therapeutic goal, and a determined current therapy type for the interaction participant.

In some embodiments, the method 600 includes: the adaptive behavioral control system selecting the computer-behavioral policy for at least one detected interaction participant based on a current therapeutic goal.

In some embodiments, the method 600 includes: for at least one detected interaction participant, the adaptive behavioral control system determining the current therapy type being used during interaction with the participant, and selecting the computer-behavioral policy based on the determined current therapy type. In some embodiments, the current therapy type includes at least one of ABA (Applied Behavioral Analysis), OT (Occupational Therapy), and MI (Motivational Interviewing) therapy. In some embodiments, the method 600 includes: for at least one detected participant, the adaptive behavioral control system selecting the computer-behavioral policy based on an identify of the interaction participant. In some embodiments, the method 600 includes: for at least one detected participant the adaptive behavioral control system determining the current interaction context of the participant, and selecting the computer-behavioral policy based on the determined current interaction context. In some embodiments, the current interaction context includes one of a date, an occasion (e.g., birthday), an event (e.g., funeral), a detected overall human emotion of at least one interaction participant (e.g., the participant seems happy or sad today).

In some embodiments, the adaptive behavioral control system includes a plurality of computer-behavioral policies. In some embodiments, the adaptive behavioral control system includes a computer-behavioral policy for each of a plurality of interaction participants. In some embodiments, the adaptive behavioral control system includes a computer-behavioral policy for each of a plurality of therapy types. In some embodiments, the adaptive behavioral control system includes a computer-behavioral policy for each of a plurality of interaction contexts. In some embodiments, the adaptive behavioral control system includes a computer-behavioral policy for each of a plurality of interaction contexts for at least one interaction participant. In some embodiments, the adaptive behavioral control system includes a computer-behavioral policy for each of a plurality of therapy types for at least one interaction participant. In some embodiments, the adaptive behavioral control system includes a computer-behavioral policy for each of a plurality of interaction contexts for each of a plurality of interaction participants. In some embodiments, the adaptive behavioral control system includes a computer-behavioral policy for each of a plurality of therapy types for each of a plurality of interaction participants.

In some embodiments, adaptive behavioral control system includes a computer-behavioral policy for each of a plurality of therapeutic goals for each of a plurality of interaction participants. In some embodiments, adaptive behavioral control system includes a computer-behavioral policy for each of a plurality of therapeutic goals for at least one interaction participant.

In some embodiments, the adaptive behavioral control system stores information indicating each detected human reaction in association with a corresponding computer-behavioral policy, and responsive to a request for human reaction information for a specified policy provided by an external system via an API of the adaptive behavioral control system, the adaptive behavioral control system provides information indicating each detected human reaction for the specified policy to the external system.

Method 700

Figure 7:
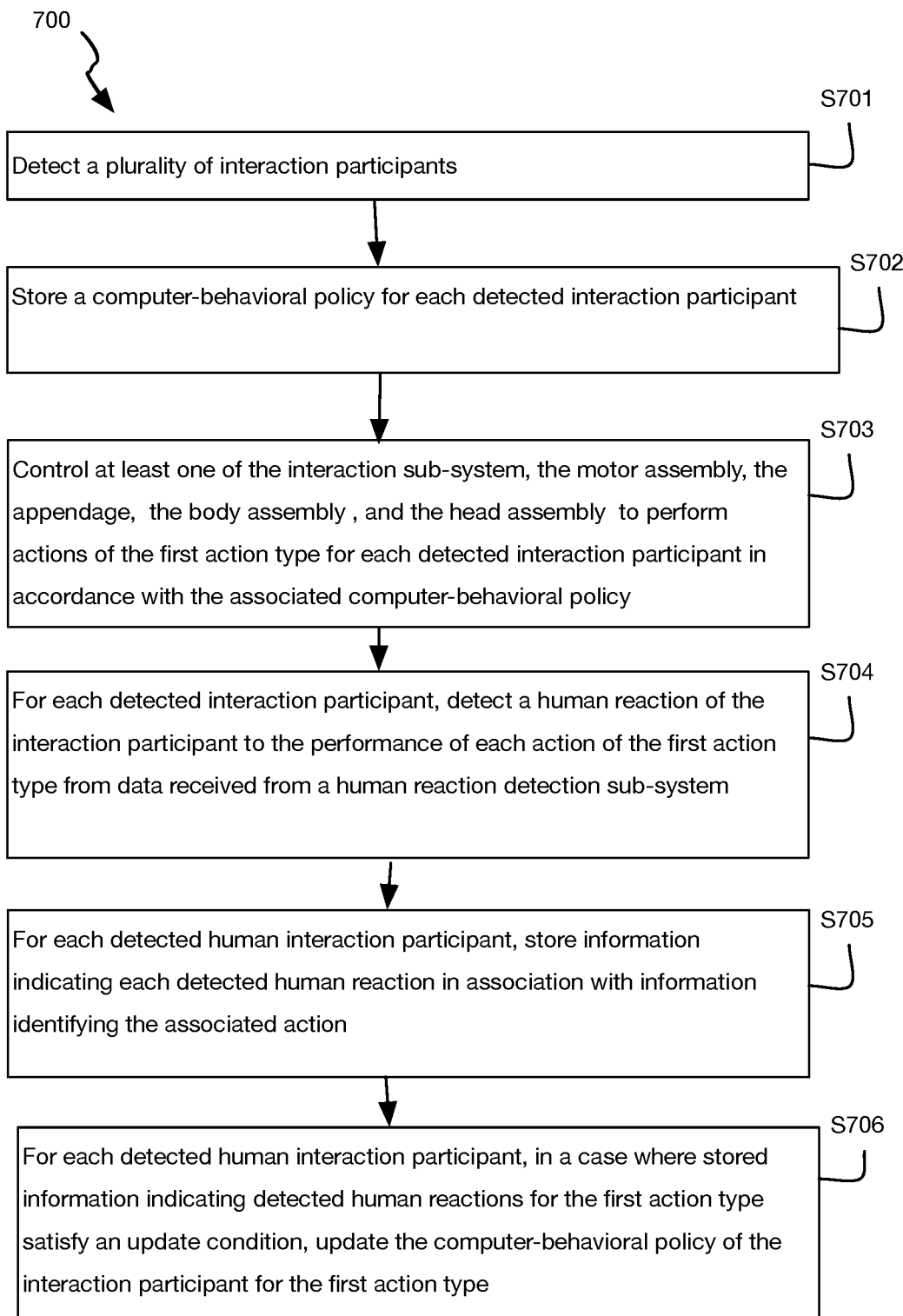

FIG. 7 is a representation of a method according to embodiments. In some embodiments, the human-machine interaction system of FIG. 1D performs the method 700.

In some embodiments, the human-machine interaction system performing the method 700 includes a body assembly (e.g., 104d); a head assembly (e.g., 103d) mechanically attached to the body assembly via a motor assembly (e.g., 162, 163); the motor assembly, the motor assembly being constructed to rotate the head assembly about a vertical axis (e.g., 160d) and a horizontal axis (e.g., 161d); at least a first motorized appendage (e.g., 105d) constructed to perform movement in accordance with at least one human-interaction gesture (e.g., an arm gesture, a hand gesture, waving, sign language, etc.); an adaptive behavioral control system (e.g., 110) communicatively coupled to at least one of the motor assembly, the head assembly, and the appendage; a human reaction detection sub-system (e.g., 111, 101d, 106d) communicatively coupled to the adaptive behavioral control system; and an interaction sub-system (e.g., 102d) communicatively coupled to the adaptive behavioral control system.

In some embodiments, the method 700 includes: an adaptive behavioral control system (e.g., 110) of a human-machine interaction system (e.g., 100d of FIG. 1D) detecting a plurality of interaction participants (e.g., 810, 820 of FIG. 8) by using at least one of a heat detection sub-system, a video capture sub-system, an audio capture sub-system, a touch sensor, a piezoelectric pressor sensor, a capacitive touch sensor, a resistive touch sensor, a blood pressure sensor, a heart rate sensor, and a biometric sensor (process S701); the adaptive behavioral control system storing at least one computer-behavioral policy (e.g., 802, 803 of FIG. 8) for each detected interaction participant (S702); the adaptive behavioral control system controlling at least one of the interaction sub-system (e.g., 102d), the motor assembly, the appendage (e.g., 105d), the body assembly (104d), and the head assembly (103d) to perform actions of a first action type for each detected interaction participant in accordance with a selected computer-behavioral policy for the interaction participant (S703); for each detected interaction participant, the adaptive behavioral control system detecting a human reaction of the interaction participant to the performance of each action of the first action type from data received from the human reaction detection sub-system (S704); and for each detected human interaction participant, the adaptive behavioral control system storing information indicating each detected human reaction in association with information identifying the associated action (S705). In some embodiments, the method 700 includes: for each detected human interaction participant, in a case where stored information indicating detected human reactions for the first action type satisfy an update condition, the adaptive behavioral control system updating the computer-behavioral policy of the interaction participant for the first action type (S706).

In some embodiments, the method 700 includes; responsive to user-input received from an operator device communicatively coupled to the adaptive behavioral control system via a network interface (e.g., 211), the adaptive behavioral control system updating at least one computer-behavioral policy based on the received user-input.

The computer-behavioral policy of each detected interaction participant is independently updated based on detected human reactions for the associated interaction participant.

Figure 8:
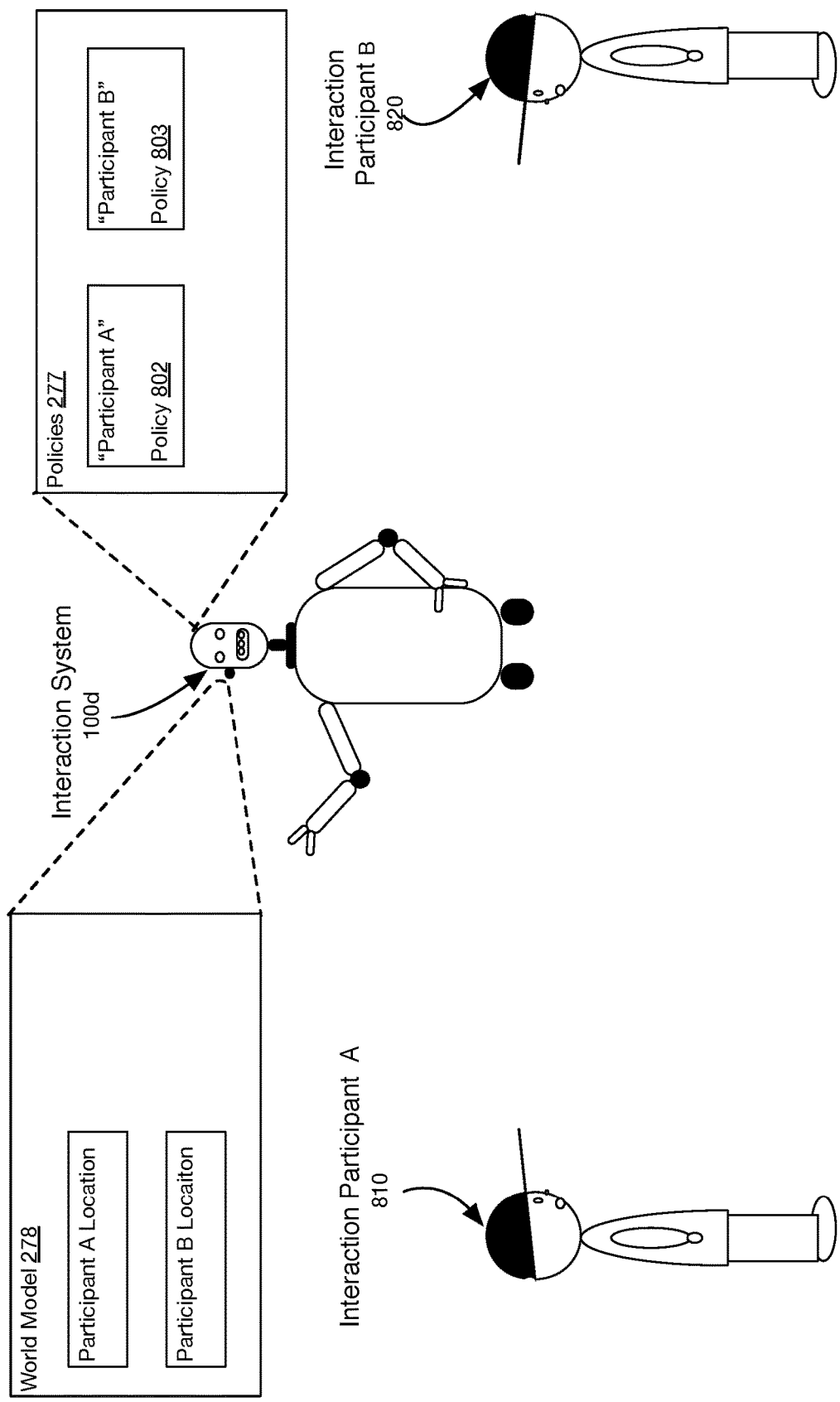
FIG. 8 is a representation of multi-party interaction, according to embodiments.

In some embodiments, detecting a plurality of interaction participants includes detecting locations of each detected interaction participant, and generating a three-dimensional world model (e.g., 278 of FIG. 8) of detected locations of the detected interaction participants (e.g., 810, 820 of FIG. 8).

In some embodiments, during initiation of an interaction with a previously detected interaction participant (e.g., 810, 820), the adaptive behavioral control system controls the motor assembly (e.g., 162, 163) to orient the head assembly (e.g., 103d) in a direction of the previously detected interaction participant by using the previously detected location included in the world model (e.g., 278).

In some embodiments, during processing of a response to an action performed by a previously detected interaction participant, the adaptive behavioral control system controls the motor assembly (e.g., 162, 163) to orient the head assembly (e.g., 103d) in a direction of the previously detected interaction participant by using the previously detected location included in the world model (e.g., 278).

In some embodiments, detecting a plurality of interaction participants includes detecting a face of each interaction participant. In some embodiments, an orientation of each detected face is recorded. In some embodiments, the three-dimensional world model (e.g., 278) indicates the orientation of each detected face, and during initiation of an interaction with a previously detected interaction participant, the adaptive behavioral control system controls the motor assembly to orient the head assembly in a direction of the face of a previously detected interaction participant by using the previously detected location and face orientation included in the world model.

In some embodiments, detecting a plurality of interaction participants includes detecting a face of each interaction participant, and the three-dimensional world model (e.g., 278) includes detected orientation of detected faces, and during processing of a response to an action performed by a previously detected interaction participant, the adaptive behavioral control system controls the motor assembly to orient the head assembly in a direction of the face of a previously detected interaction participant by using the previously detected location and face orientation included in the world model.

In some embodiments, the adaptive behavioral control system stores at least a first computer-behavioral policy for a first interaction participant and a second computer-behavioral policy for a second interaction participant, the first policy and the second policy each specifying a same plurality of actions for the first action type, each action being a different alternative action for the action type.

In some embodiments, process S703 is similar to process S401 of FIG. 4. In some embodiments, process S704 is similar to process S402 of FIG. 4. In some embodiments, process S705 is similar to process S403 of FIG. 4. In some embodiments, process S706 is similar to process S404 of FIG. 4.

Policy Selection

In some embodiments, the method 700 includes: the adaptive behavioral control system selecting a computer-behavioral policy for each detected interaction participant based on at least one of an identity of the interaction participant, a determined current interaction context for the interaction participant, an action type, a current therapeutic goal, and a determined current therapy type for the interaction participant.

In some embodiments, the method boo includes: the adaptive behavioral control system selecting the computer-behavioral policy for at least one detected interaction participant based on a current therapeutic goal.

In some embodiments, the method 700 includes: for at least one detected interaction participant, the adaptive behavioral control system determining the current therapy type being used during interaction with the participant, and selecting the computer-behavioral policy based on the determined current therapy type. In some embodiments, the current therapy type includes at least one of ABA (Applied Behavioral Analysis), OT (Occupational Therapy), and MI (Motivational Interviewing) therapy. In some embodiments, the method 700 includes: for at least one detected participant, the adaptive behavioral control system selecting the computer-behavioral policy based on an identify of the interaction participant. In some embodiments, the method 700 includes: for at least one detected participant the adaptive behavioral control system determining the current interaction context of the participant, and selecting the computer-behavioral policy based on the determined current interaction context. In some embodiments, the current interaction context includes one of a date, an occasion (e.g., birthday), an event (e.g., funeral), a detected overall human emotion of at least one interaction participant (e.g., the participant seems happy or sad today).

In some embodiments, adaptive behavioral control system includes a plurality of computer-behavioral policies. In some embodiments, adaptive behavioral control system includes a computer-behavioral policy for each of a plurality of interaction participants. In some embodiments, adaptive behavioral control system includes a computer-behavioral policy for each of a plurality of therapy types. In some embodiments, adaptive behavioral control system includes a computer-behavioral policy for each of a plurality of interaction contexts. In some embodiments, adaptive behavioral control system includes a computer-behavioral policy for each of a plurality of interaction contexts for at least one interaction participant. In some embodiments, adaptive behavioral control system includes a computer-behavioral policy for each of a plurality of therapy types for at least one interaction participant. In some embodiments, adaptive behavioral control system includes a computer-behavioral policy for each of a plurality of interaction contexts for each of a plurality of interaction participants. In some embodiments, adaptive behavioral control system includes a computer-behavioral policy for each of a plurality of therapy types for each of a plurality of interaction participants.

In some embodiments, adaptive behavioral control system includes a computer-behavioral policy for each of a plurality of therapeutic goals for each of a plurality of interaction participants. In some embodiments, adaptive behavioral control system includes a computer-behavioral policy for each of a plurality of therapeutic goals for at least one interaction participant.

In some embodiments, the adaptive behavioral control system stores information indicating each detected human reaction in association with a corresponding computer-behavioral policy, and responsive to a request for human reaction information for a specified policy provided by an external system via an API of the adaptive behavioral control system, the adaptive behavioral control system provides information indicating each detected human reaction for the specified policy to the external system.

Multi-Party and Multi-Plane Interaction

In some embodiments, an action of the first action type is an action for controlling a robotic body head assembly (e.g., 103d of FIG. 1D) of the human-machine interaction system to orient the head assembly in a direction of a detected interaction participant (e.g., 810, 820). In some embodiments, an action of the first action type is an action for controlling robotic body head assembly of the human-machine interaction system to orient the head assembly in a direction of a detected face of a detected interaction participant.

In some embodiments, during initiation of an interaction with a previously detected interaction participant, the human-machine interaction system (e.g., 100d of FIG. 1D) is constructed to orient the head assembly in a direction of the previously detected interaction participant (e.g., 810, 820) by using a previously detected location of the participant specified by a world model (e.g., 278) stored by the human-machine interaction system. In some embodiments, during initiation of an interaction with a previously detected interaction participant, the human-machine interaction system (e.g., 100d of FIG. 1D) is constructed to orient the head assembly in a direction of a detected face of a detected interaction participant, by using a previously detected location and a previously detected face orientation of the participant specified by a world model (e.g., 278) stored by the human-machine interaction system.

In some embodiments, during processing of a response to an action performed by a previously detected interaction participant, the human-machine interaction system (e.g., 100d of FIG. 1D) is constructed to orient the head assembly in a direction of the previously detected interaction participant (e.g., 810, 820) by using a previously detected location of the participant specified by a world model (e.g., 278) stored by the human-machine interaction system. In some embodiments, during processing of a response to an action performed by a previously detected interaction participant, the human-machine interaction system (e.g., 100d of FIG. 1D) is constructed to orient the head assembly in a direction of a detected face of a detected interaction participant, by using a previously detected location and a previously detected face orientation of the participant specified by a world model (e.g., 278) stored by the human-machine interaction system.

In some embodiments, the head assembly (e.g., 103d) includes a motorized assembly (e.g., 162, 163) that is constructed to rotate the head assembly (e.g., 103d) in at least one degree of freedom in relation to the body assembly (e.g., 104d), and during control of the robotic head assembly to orient the head assembly in a direction of the interaction participant, the adaptive behavioral control system controls the head assembly to rotate about a first axis (e.g., 160d) in the direction of the detected interaction participant.

Motorized Assembly Rotating Head

In some embodiments, the head assembly includes a motorized assembly (e.g., 162, 163) that is constructed to rotate the head assembly in at least two degrees of freedom in relation to the body assembly, and during control of the robotic head assembly to orient the head assembly in a direction of a detected face of an interaction participant, the adaptive behavioral control system controls the head assembly to rotate about a first axis (e.g., 160d) in the direction of the interaction participant, and controls the head assembly to rotate about a second axis (e.g., 161d) towards the detected face. In some embodiments, the first axis is a vertical axis (e.g., 160d) and the second axis is a horizontal axis (e.g., 161d).

Detecting Participants

In some embodiments, the adaptive behavioral control system detects participants by using at least one of temperature data captured by a heat detection sub-system (e.g., infrared camera, heat sensor, and the like), image data captured by a video capture sub-system (e.g., 101d) and audio data captured by an audio capture sub-system (e.g., 106d).

In some embodiments, the adaptive behavioral control system determines a direction of a detected participant by using at least one of temperature data captured by a heat detection sub-system (e.g., infrared camera, heat sensor, and the like), image data captured by a video capture sub-system (e.g., 101d), audio data captured by an audio capture sub-system (e.g., 106d), and rotational position information of a motor assembly (e.g., 162, 163). In some embodiments, the adaptive behavioral control system determines a direction of a detected participant by using at least one of temperature data captured by a heat detection sub-system (e.g., infrared camera, heat sensor, and the like), image data captured by a video capture sub-system (e.g., 101d), audio data captured by an audio capture sub-system (e.g., 106d), IMU data generated by an IMU of the human-machine interaction system, accelerometer data generated by an accelerometer of the human-machine interaction system, and rotational position information of a motor assembly (e.g., 162, 163).

In some embodiments, for each detected interaction participant, the adaptive behavioral control system stores information identifying the detected participant in association with information indicating the determined direction of the detected participant in a world model (e.g., 278).

In some embodiments, the adaptive behavioral control system determines an orientation of a face of a detected participant by using at least one of temperature data captured by a heat detection sub-system (e.g., infrared camera, heat sensor, and the like), image data captured by a video capture sub-system (e.g., 101d), audio data captured by an audio capture sub-system (e.g., 106d), and rotational position information of a motor assembly (e.g., 162, 163). In some embodiments, the adaptive behavioral control system determines an orientation of a face of a detected participant by using at least one of temperature data captured by a heat detection sub-system (e.g., infrared camera, heat sensor, and the like), image data captured by a video capture sub-system (e.g., 101d), audio data captured by an audio capture sub-system (e.g., 106d), IMU data generated by an IMU of the human-machine interaction system, accelerometer data generated by an accelerometer of the human-machine interaction system, and rotational position information of a motor assembly (e.g., 162, 163).

In some embodiments, for each detected interaction participant, the adaptive behavioral control system stores information identifying the detected participant in association with information indicating the determined direction of the detected participant and information indicating the determined facial orientation of the participant in a world model (e.g., 278).

In some embodiments, the audio capture sub-system captures audio emitted by the participant, and generates audio data corresponding to the captured audio, and the adaptive behavioral control system uses the audio data to identify presence and general location of the participant. In some embodiments, the audio capture sub-system includes a microphone array that is constructed to generate directional information corresponding to captured audio based on a direction associated with a microphone of the array that captures the audio at a highest volume level among volume levels of audio captured by the microphones of the microphone array. As shown in FIG. 1B, the microphones 120 comprise a microphone array of six microphones. In some embodiments, the adaptive behavioral control system determines that a participant emitting audio is closest to a microphone 120 that captures a highest audio volume for the audio emitted by the participant.

In some embodiments, the audio capture sub-system captures audio emitted by the participant, and generates audio data corresponding to the captured audio, and the adaptive behavioral control system uses the audio data to identify presence of the participant by recognizing the audio emitted by the participant as matching audio emitted by a human. In some embodiments, the audio capture sub-system captures audio emitted by the participant, and generates audio data corresponding to the captured audio, and the adaptive behavioral control system uses the audio data to identify presence of the participant by recognizing the audio emitted by the participant as matching audio emitted by a human that is not a currently recognized participant. In some embodiments, the audio capture sub-system captures audio emitted by the participant, generates audio data corresponding to the captured audio, determines whether the audio data corresponds to a human voice, determines whether the human voice corresponds to a current participant, and responsive to a determination that the human voice does not correspond to a current human interaction participant, the adaptive behavioral control system identifies the presence of a new participant.

In some embodiments, the audio capture sub-system captures audio and generates audio data corresponding to the captured audio, the adaptive behavioral control system determines whether the audio data corresponds to an environment change that corresponds to presence of a new interaction participant, and in a case where the adaptive behavioral control system determines that the audio data corresponds to an environment change that corresponds to presence of a new interaction participant, the adaptive behavioral control system identifies presence of a new interaction participant. In some embodiments, audio data that corresponds to an environment change that corresponds to presence of a new interaction participant includes audio data that corresponds to opening of a door. In some embodiments, audio data that corresponds to an environment change that corresponds to presence of a new interaction participant includes audio data that corresponds to footsteps. In some embodiments, audio data that corresponds to an environment change that corresponds to presence of a new interaction participant includes audio data that corresponds to breathing.

In some embodiments, the orientation of the face of the detected participant is determined by using image data captured by a video capture sub-system (e.g., 101*d* of FIG. 1D) of the human-machine interaction system. In some embodiments, the video capture sub-system captures images and generates image data corresponding to the captured images, the adaptive behavioral control system determines whether the image data corresponds to a human face, and responsive to a determination that the image data corresponds to a human face, the adaptive behavioral control system performs a face detection process to identify an orientation of the detected human face.

In some embodiments, the adaptive behavioral control system is constructed to detect presence of interaction participants and respective locations, and generate a three-dimensional world model of detected locations of detected interaction participants. In some embodiments, the adaptive behavioral control system is constructed to detect presence of interaction participants by using a video capture sub-system of the human-machine interaction system, as described herein. In some embodiments, the adaptive behavioral control system is constructed to detect presence of interaction participants by using an audio capture sub-system of the human-machine interaction system, as described herein. In some embodiments, the adaptive behavioral control system is constructed to detect locations of interaction participants by using a video capture sub-system, as described herein. In some embodiments, the adaptive behavioral control system is constructed to detect locations of interaction participants by using an audio capture sub-system, as described herein.

In some embodiments, during initiation of an interaction with a previously detected interaction participant, the adaptive behavioral control system controls the face assembly to orient the face assembly in a direction of a detected interaction participant by using the previously detected location included in the world model.

In some embodiments, during processing of a response to an action performed by a previously detected interaction participant, the adaptive behavioral control system controls the face assembly to orient the face assembly in a direction of a detected interaction participant by using the previously detected location included in the world model.

In some embodiments, the adaptive behavioral control system is constructed to generate a three-dimensional world model of all detected faces, and wherein during initiation of an interaction with a participant associated with a previously detected face, the adaptive behavioral control system controls the face assembly to orient the face assembly in a direction of a detected face by using the previously detected direction included in the world model.

System Architecture

FIG. 2 is a diagram depicting system architecture of an adaptive behavioral control system (e.g., 110 of FIG. 1A), according to embodiments. In some embodiments, the system of FIG. 2 is implemented as a single hardware device. In some embodiments, the system of FIG. 2 is implemented as a plurality of hardware devices. In some embodiments, the system of FIG. 2 is implemented as an ASIC (Application-Specific Integrated Circuit). the system of FIG. 2 is implemented as an FPGA (Field-Programmable Gate Array). the system of FIG. 2 is implemented as a SoC (System-on-Chip). In some embodiments, the bus 201 interfaces with the processors 201A-N, the main memory 222 (e.g., a random access memory (RAM)), a read only memory (ROM) 206, a processor-readable storage medium 205, and a network device 211. In some embodiments, bus 201 interfaces with at least one of a display device (e.g., 102*c*) and a user input device.

In some embodiments, bus 201 interfaces with an audio system device 271. In some embodiments, the audio system device 271 includes the audio input processor 121. In some embodiments, the audio system device 271 includes the audio output controller 131. In some embodiments, the audio system interface device 271 includes an audio system of the human reaction detection sub-system 111. In some embodiments, the audio system interface device 271 includes an audio system of the interaction sub-system 111. In some embodiments, the audio system device 271 includes a speaker (e.g., 120 of FIG. 1B, 102*d* of FIG. 1D). In some embodiments, the audio system device 271 includes a microphone (e.g., 130 of FIG. 1B, 106*d* of FIG. 1D).

In some embodiments, bus 201 interfaces with a video system device 272. In some embodiments, the video system device 272 includes a video system of the human reaction detection sub-system 111. In some embodiments, the video system device 272 includes display system of the interaction sub-system 111. In some embodiments, the video system device 272 includes a camera (e.g., low of FIG. 1C, 101*d* of FIG. 1D). In some embodiments, the video system device 272 includes a display (e.g., 102C of FIG. 1C, 106*d* of FIG. 1D).

In some embodiments, bus 201 interfaces with a motor controller 273. In some embodiments, the motor controller 273 is constructed to control at least one of the motors 162 and 163 of the robot system 100*d* of FIG. 1D. In some embodiments, the motor controller 273 is constructed to control an appendage (e.g., 105*d*) of the robot system 100*d* of FIG. 1D. In some embodiments, the motor controller 273 is constructed to control a motor of an appendage (e.g., 105*d*) of the robot system 100*d* of FIG. 1D. In some embodiments, the motor controller 273 is constructed to control a motor of the body assembly 104*d* of the robot system 100*d* of FIG. 1D.

In some embodiments, the processors include one or more of an ARM processor, an X86 processor, a GPU (Graphics Processing Unit), and the like. In some embodiments, at least one of the processors includes at least one arithmetic logic unit (ALU) that supports a SIMD (Single Instruction Multiple Data) system that provides native support for multiply and accumulate operations.

In some embodiments, at least one of a central processing unit (processor), a GPU, and a multi-processor unit (MPU) is included.

In some embodiments, the processors and the main memory form a processing unit 299. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some embodiments, the processing unit includes at least one arithmetic logic unit (ALU) that supports a SIMD (Single Instruction Multiple Data) system that provides native support for multiply and accumulate operations. In some embodiments the processing unit is a Central Processing Unit such as an Intel Xeon processor. In other embodiments, the processing unit includes a Graphical Processing Unit such as NVIDIA Tesla.

The network adapter device 211 provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

In some embodiments, network device 211 is communicatively coupled to another human-machine interaction system. In some embodiments, network device 211 is communicatively coupled to another human-machine interaction system via a network (e.g., the Internet). In some embodiments, the network device 211 is communicatively coupled to a human-machine interaction server via a network (e.g., the Internet), and the human-machine interaction server is constructed to provide computer-behavioral policies to the adaptive behavioral control system via the network device 211. In some embodiments, the human-machine interaction server is constructed to provide information for detected human reactions recognized by other human-machine interaction systems for at least one action of a computer-behavioral policy of the adaptive behavioral control system via the network device 211. In this manner, the adaptive behavioral control system of FIG. 2 is constructed to update its computer-behavioral policies based on human reactions detected by external human-machine interaction systems (e.g., robot interaction systems, such as 100d of FIG. 1D).

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs.

The processor-readable storage medium 605 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 205 includes machine-executable instructions (and related data) for an operating system 212, software programs 213, device drivers 214, and machine-executable instructions for one or more of the processes of FIGS. 4-7. In some embodiments, the processor-readable storage medium 205 includes data of at least one computer-behavioral policy 277. In some embodiments, the processor-readable storage medium 205 includes stored information indicating detected human reactions. In some embodiments, the processor-readable storage medium 205 includes a world model 278 of detected locations of the detected interaction participants, as described herein.

In some embodiments, the processor-readable storage medium 205 includes machine-executable instructions for an emotion detection module 279. In some embodiments, emotion detection module 279 is constructed to detect an emotion based on captured image data. In some embodiments, emotion detection module 279 is constructed to detect an emotion based on captured audio data. In some embodiments, emotion detection module 279 is constructed to detect an emotion based on captured image data and captured audio data. In some embodiments, emotions detectable by the emotion detection module 279 include anger, contempt, disgust, fear, happiness, neutral, sadness, and surprise. In some embodiments, emotions detectable by the emotion detection module 279 include happy, sad, angry, confused, disgusted, surprised, calm, unknown. In some embodiments, the emotion detection module 279 is constructed to classify detected emotions as either positive, negative, or neutral. In some embodiments, the adaptive behavioral control system uses the emotion detection module 279 to obtain a determined emotion classification (e.g., positive, neutral, negative) after performance of an action of the first action type, and store the determined emotion classification in association with the performed action (e.g., in the storage medium 205).

Machines

The systems and methods of some embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Conclusion

As a person skilled in the art will recognize from the previous detailed description and from the figures and claims, modifications and changes can be made to the embodiments disclosed herein without departing from the scope defined in the claims.

What is claimed is:

1. A method comprising:
an adaptive behavioral control system of a human-machine interaction system detecting a plurality of interaction participants by using at least one sensor;
the adaptive behavioral control system storing at least one computer-behavioral policy for each detected interaction participant:

the adaptive behavioral control system controlling an interaction sub-system to perform actions of a first action type for each detected interaction participant in accordance with a selected computer-behavioral policy for the interaction participant;

for each detected interaction participant, the adaptive behavioral control system detecting a human reaction of the interaction participant to the performance of each action of the first action type from data received from a human reaction detection sub-system;

for each detected human interaction participant, the adaptive behavioral control system storing information indicating each detected human reaction in association with information identifying the associated action;

for each detected human interaction participant, in a case where stored information indicating detected human reactions for the first action type satisfy an update condition, the adaptive behavioral control system updating the selected computer-behavioral policy of the interaction participant for the first action type;

wherein an adaptive behavioral control system of a human-machine interaction system detecting a plurality of interaction participants by using at least one sensor comprises:

detecting locations of each detected interaction participant, and generating a three-dimensional world model of detected locations of the detected interaction participants.

2. The method of claim 1, wherein the at least one sensor is at least one of a sensor of a heat detection sub-system, a sensor of a video capture sub-system, a sensor of an audio capture sub-system, a touch sensor, a piezoelectric presser sensor, a capacitive touch sensor, a resistive touch sensor, a blood pressure sensor, a heart rate sensor, and a biometric sensor.

3. The method of claim 1, wherein the adaptive behavioral control system stores information indicating each detected human reaction in association with a corresponding computer behavioral policy, and the method further comprising: responsive to a reaction information request from an external system via an application programming interface (API) of the adaptive behavioral control system, the reaction information request specifying a computer-behavioral policy, the adaptive behavioral control system providing to the external system the stored information indicating each detected human reaction for the specified computer-behavioral policy as a response to the reaction information request.

4. The method of claim 1 further comprising: the adaptive behavioral control system selecting a computer-behavioral policy for each detected interaction participant based on at least one of an identity of the interaction participant, a determined current interaction context for the interaction participant, an action type, a current therapeutic goal, and a determined current therapy type for the interaction participant.

5. The method of claim 1, wherein at least one action for the first action type includes performing a facial expression by controlling a robotic head assembly.

6. The method of claim 5, wherein the head assembly includes at least one mechanical facial feature, and the robotic head assembly is constructed to control movement of the at least one mechanical facial feature to perform at least one facial expression.

7. The method of claim 5, wherein the head assembly includes at least one display device, and the robotic head assembly is constructed to control display of the display device to perform at least one facial expression.

8. The method of claim 5, wherein the head assembly includes at least one light emission subsystem, and the robotic head assembly is constructed to control light emission of the light emission display system to perform at least one facial expression.

9. The method of claim 5, wherein the head assembly includes at least one LED ring, and the robotic head assembly is constructed to control at least one LED of the LED ring to perform at least one facial expression.

10. The method of claim 1, wherein at least one action for the first action type includes controlling a robotic head assembly to output audio in a particular voice, by controlling an audio output sub-system of the robotic head assembly.

11. The method of claim 1, wherein at least one action for the first action type includes controlling a robotic head assembly to output audible speech, by controlling an audio output sub-system of the robotic head assembly.

12. The method of claim 1, wherein at least one action for the first action type includes controlling at least a first motorized appendage to perform movement in accordance with at least one human-interaction gesture.

13. The method of claim 1, wherein at least one human-interaction gesture includes a hand gesture recognizable by a human.

14. The method of claim 1, wherein at least one human-interaction gesture includes an arm gesture recognizable by a human.

15. The method of claim 1, wherein during initiation of an interaction with a previously detected interaction participant. the adaptive behavioral control system is constructed to control a motor assembly to orient a head assembly in a direction of the previously detected interaction participant by using the previously detected location included in the world model.

16. The method of claim 15, wherein detecting a plurality of interaction participants comprises detecting a face of each interaction participant, wherein the three-dimensional world model includes a detected orientation of detected faces, wherein during initiation of an interaction with a previously detected interaction participant, the adaptive behavioral control system is constructed to control the motor assembly to orient the head assembly in a direction of the face of a previously detected interaction participant by using the previously detected location and face orientation included in the world model.

17. The method of claim 1, wherein during processing of a response to an action performed by a previously detected interaction participant, the adaptive behavioral control system is constructed to control a motor assembly to orient a head assembly in a direction of the previously detected interaction participant by using the previously detected location included in the world model.

18. The method of claim 17, wherein detecting a plurality of interaction participants comprises detecting a face of each interaction participant, wherein the three-dimensional world model includes a detected orientation of detected faces, wherein during processing of a response to an action performed by a previously detected interaction participant, the adaptive behavioral control system is constructed to control the motor assembly to orient the head assembly in a direction of the face of a previously detected interaction participant by using the previously detected location and face orientation included in the world model.

19. The method of claim 1, further comprising: the adaptive behavioral control system selecting the computer-behavioral policy for at least one detected interaction participant based on a current therapeutic goal.

20. The method of claim 1, further comprising: for at least one detected interaction participant, the adaptive behavioral control system determining a current therapy type being used during interaction with the participant, and selecting the computer-behavioral policy based on the determined current therapy type.

21. The method of claim 1, further comprising: for at least one detected participant, the adaptive behavioral control system selecting the computer behavioral policy based on an identity of the interaction participant.

22. The method of claim 1, further comprising: for at least one detected participant the adaptive behavioral control system determining a current interaction context of the participant, and selecting the computer-behavioral policy based on the determined current interaction context.

23. The method of claim 1, wherein the adaptive behavioral control system includes a computer-behavioral policy for each of a plurality of therapy types for each of a plurality of interaction participants.

* * * * *